US005684534A

United States Patent [19]
Harney et al.

[11] Patent Number: 5,684,534
[45] Date of Patent: Nov. 4, 1997

[54] TASK-SPLITTING DUAL-PROCESSOR SYSTEM FOR MOTION ESTIMATION PROCESSING

[75] Inventors: Kevin Harney, Brooklyn, N.Y.; Mike S. Kelly, Phoenix, Ariz.; Gary Loeser, Ocean, N.J.

[73] Assignee: Intel Corporation, Santa Clara, Calif.

[21] Appl. No.: 67,864

[22] Filed: May 26, 1993

[51] Int. Cl.⁶ .................................................. H04N 7/32
[52] U.S. Cl. .......................... 348/390; 342/402; 342/405; 342/413; 342/416
[58] Field of Search ............................ 348/384, 390, 348/400, 401, 402, 403, 404, 405, 406, 407, 413, 416, 422; H04N 7/32

[56] References Cited

U.S. PATENT DOCUMENTS

| | | | |
|---|---|---|---|
| 4,706,265 | 11/1987 | Furukawa | 348/390 |
| 4,780,761 | 10/1988 | Daly et al. | 348/384 |
| 4,849,810 | 7/1989 | Ericsson | 348/416 |
| 5,019,901 | 5/1991 | Uomori et al. | 348/699 |
| 5,073,820 | 12/1991 | Nakagawa et al. | 348/405 |
| 5,113,255 | 5/1992 | Nagata et al. | 348/384 |
| 5,126,841 | 6/1992 | Tanaka et al. | 348/415 |
| 5,150,209 | 9/1992 | Baker et al. | 348/407 |
| 5,151,784 | 9/1992 | Lavagetto et al. | 348/416 |
| 5,173,773 | 12/1992 | Ueda et al. | 348/390 |
| 5,198,901 | 3/1993 | Lynch | 348/413 |
| 5,237,410 | 8/1993 | Inoue | 348/402 |
| 5,251,028 | 10/1993 | Iu | 348/413 |
| 5,329,318 | 7/1994 | Keith | 348/699 |
| 5,436,666 | 7/1995 | Astle | 348/416 |
| 5,448,310 | 9/1995 | Kopet et al. | 348/699 |

*Primary Examiner*—Tommy P. Chin
*Assistant Examiner*—Vu Le
*Attorney, Agent, or Firm*—William H. Murray; N. Stephen Kinsella

[57] ABSTRACT

A video processor system has separate and independent video processors for performing a variety of video processor functions required for encoding and decoding video signals. Each of the separate video processors performs its own individual set of video processor functions. During the encode process the first video processor performs motion estimation to provide motion estimation information which it applies to the second video processor. The second video processor receives the motion estimation information and performs forward and inverse discrete cosine transforms, quantization and dequantization, frame addition and frame differencing, as well as run length encoding. The run length encoding operation produces run/value pairs which are then applied to the first video processor. The first video processor performs variable length encoding upon the run/value pairs. During the decoding process the first video processor performs a variable length decode and applies the variable length decoded data to the second video processor. The second video processor performs run length decoding, dequantization, inverse discrete cosine transforms and frame addition according to the received variable length data. The inverse transformed data produced by this operation is then applied to the first video processor.

10 Claims, 20 Drawing Sheets

TASK-SPLITTING DUAL-PROCESSOR SYSTEM FOR MOTION ESTIMATION PROCESSING

BACKGROUND OF THE INVENTION

1. Field of the Invention

This invention relates to the field of video processing and, in particular, to the compression and decompression of video signals.

2. Background Art Statement

It is well-known to provide hardware circuitry for performing video encoding and decoding operations. In particular, it is known to provide hardware circuitry to perform frame adds and frame subtracts, run length encoding and decoding, forward and inverse discrete cosine transforms, and quantization/dequantization operations as well as motion estimation and variable length encoding and decoding. When greater processing power was required or when improved algorithms became available in these systems, it was thus necessary to perform hardware redesign and provide new integrated circuit chips. These redesigns were very expensive and slow.

However, many of these operations were much too complex to be performed by software since executing software capable of performing these tasks would require too much time to be useful for video processing. An exception to this is the processing required for motion estimation. However, improvements in motion estimation methods still required extension hardware redesign since these operations were embedded in the overall hardware circuitry. The motion estimation process required a great deal of memory space because several different images had to be buffered. These images included a current image being encoded, the previous image, a companded image provided by decoding the data being encoded and transmitted, and the new digitized video data being received by the system. Thus four full size image buffers were required.

It is well known to perform loop filtering within video compression and decompression these systems. For example, it is known to provide a two-dimensional spatial filter which operates on pels within a predicted eight-by-eight block. The filter is separable into two one-dimensional functions, horizontal and vertical. Both the horizontal function and the vertical function are nonrecursive with coefficients of one-quarter, one-half and one-quarter except at block edges where one of the tags would fall outside the block. In such cases the one-dimensional filter is altered to have coefficients zero, one and zero. Full arithmetic precision is retained with rounding to eight bit integer values at the two-dimensional filter output.

In addition, it is a well known to provide quantization within these systems. In a typical system the number of quantizations may be one for the intrablock encoded DC coefficient and thirty-one for all other coefficients. Within a macroblock the same quantization is used for all coefficients except the intrablock encoded DC quantization. The decision levels may not be defined. The intrablock encoded dc coefficient is nominally the transform value linearly quantized with a step size of eight and no dead zone. Each of the other thirty-one quantizations is also nominally linear but with a central dead zone around zero and with a step size of an even value in the range two to sixty-two. In these systems the full dynamic range of the transformed coefficients cannot be represented for smaller quantization step sizes.

To prevent quantization distortion of transformed coefficient amplitudes causing arithmetic overflow in the encoder and decoder loops, clipping functions are sometimes inserted. The clipping functions are applied to the reconstructed image which is formed by summing the prediction and the prediction error as modified by the coding process. This clipper operates on resulting pel values less than zero or greater than two hundred fifty-five, changing them to zero and two hundred fifty-five respectively.

Values that are quantized in this manner may be dequantized in the following manner. For all coefficients other than the intrablock encoded DC quantization the reconstruction levels, REC, are in the range of −2048 to 2047 and are given by clipping the results of the following equations:

$$REC=QUANT*(2*LEVEL+1); LEVEL>0 \quad QUANT=\text{"odd"}$$

$$REC=QUANT*(2*LEVEL-1); LEVEL<0 \quad QUANT=\text{"odd"}$$

$$REC=QUANT*(2*LEVEL+1)-1; LEVEL>0 \quad QUANT=\text{"even"}$$

$$REC=QUANT*(2*LEVEL-1)+1; LEVEL<0 \quad QUANT=\text{"even"}$$

$$REC=0; LEVEL=0$$

Where QUANT ranges from one to thirty-one. These reconstruction levels are symmetrical with respect to the sign of LEVEL except for the values 2047 and −2048.

In the case of blocks which are intrablock encoded the first coefficient is nominally the transform DC value linearly quantized with a step size of eight and no dead zone.

The resulting values are represented with eight bits. A nominally black block provides the value 0001 0000 and a nominally white block yields 1110 1011. The codes 0000 0000 and 1000 0000 are not used. The reconstruction level of 1024 is coded as 1111 1111. Coefficients after the last non-zero one are not transmitted.

It is also know to provide both hardware and software forward and inverse discrete cosine transforms in these systems. When hardware is provided for this purpose space is wasted on the integrated circuit chip because only one transform is performed at a time. Thus space on the chip is always taken up by a transform circuit which is not in use.

It is common to perform these discrete cosine transforms using a number of multipliers and adders. For example it is known to perform an eight point fast discrete cosine transform in a single clock cycle using twelve multipliers and twenty-nine adders. It is also known to perform it in more clock cycles using less hardware. These different transform devices are useful for different applications. For example many high quality video applications require great speed and a great deal of space for transform hardware may be provided. In other applications, for example, video conferencing great speed is not required and it is preferred to provide more efficient use of hardware application.

SUMMARY OF THE INVENTION

A video processor system is provided with two separate and independent video processors for performing a variety of video processor functions required for encoding and decoding video signals. Each of the separate video processors performs its own individual set of video processor functions. During the encode process the first video processor performs motion estimation to provide motion estimation information which it applies to the second video processor. The second video processor receives the motion estimation information and performs forward and inverse discrete cosine transforms, quantization and dequantization, frame addition and frame differencing, as well as run length encoding. The run length encoding operation produces run/ value pairs which are then applied to the first video processor. The first video processor performs variable length encoding upon the run/value pairs. During the decoding process the first video processor performs a variable length decode and applies the variable length decoded data to the second video processor. The second video processor performs run length decoding, dequantization, inverse discrete cosine transforms and frame addition according to the received valuable length data. The inverse transformed data produced by this operation is then applied to the first video processor.

DETAILED DESCRIPTION OF THE INVENTION

Figure 1:
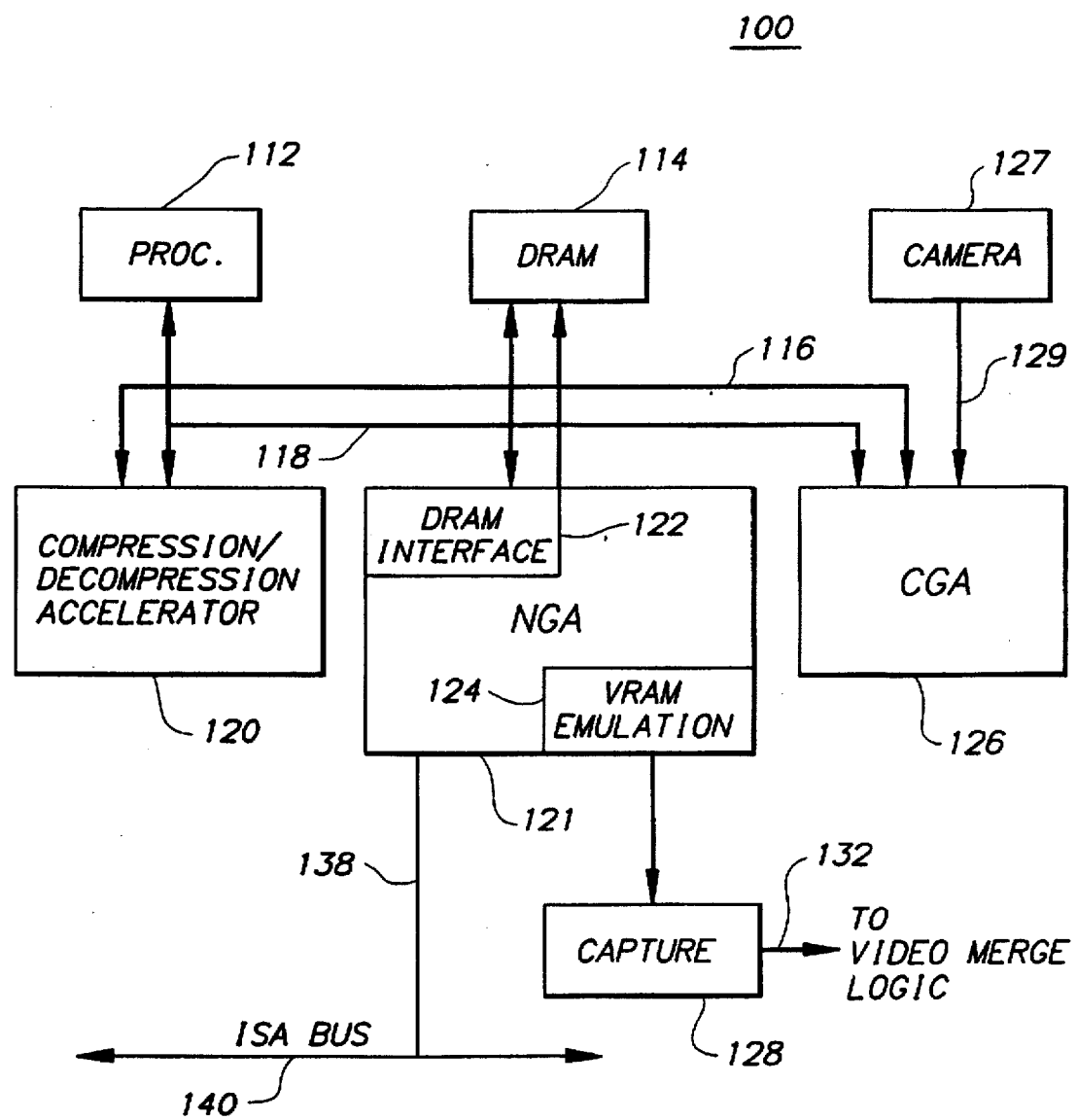
FIG. 1 shows a block diagram representation of a video processing system including a system and method for accelerating the compression and decompression of digital video signals of the present invention.

Referring now to FIG. 1, there is shown remote video processing system 100 including a general digital video processor 112 and a specialized digital video processor 120, also known as a compression/decompression accelerator 120. The bus structure of remote video processing system 100, including address bus 116 and data bus 118, permits easy interconnection of the components of a multimedia display system without using a host processor bus. For example, the local video data of video camera 127 may be received by video processing system 100 by way of line 129 and captured, digitized, subsampled and scaled by video capture 126. The signals provided by video capture 126 may then be processed by system 100 for transmission to merge logic video by way of system output line 132 and capture 128. All of these operations are performed by remote video processing system 100 without use of a host processor bus or an industry standard bus such as bus 140 which may couple remote system 100 to a host computer by way of bus 138. Because system 100 interfaces a source of video data such as video camera 127 to bus 140, system 100 may be understood to be a remote video interface system 100.

Within video processing system 100 digital video processor 112 performs software processing while accelerator 120 does hardwired functions. Thus video processor 112 includes the devices known to those skilled in the art which are effective to permit execution of program instructions. A digital video processor of this type is taught in "Reconfigurable Interrupt Device", U.S. Ser. No. 08/051,038 filed Apr. 21, 1993, by Farrell et al. and incorporated by reference herein. Nucleus gate array 121 performs the required memory interface functions for integrated system 100. For example, VRAM emulation block 124 makes nucleus gate array 121 function like DRAM with respect to capture 128. Video processing system 100 is therefore limited to the memory configurations supported by nucleus gate array 121.

In a typical configuration of remote video processing system 100 up to sixteen megabytes of address space may be supported. The first fifteen megabytes of this address space may be reserved for DRAM, for example, DRAM 114, which is interfaced with nucleus gate array 121 by DRAM interface 122. The upper one megabyte of the memory space of video processing system 100 is reserved for communication between various devices which may be coupled to address bus 116 and data bus 118. Compression/decompression accelerator 120 may occupy the first one hundred twenty-eight kilobytes of the communication area in the upper one megabyte of memory space.

Compression/decompression accelerator 120 is not required to decode all of the available one hundred twenty-eight kilobyte address space because the area is well in excess of the requirement for an internal register map. Accelerator 120 may be an initiator or a target in a bus transaction within remote video interface system 100. When accelerator 120 initiates actions it fetches thirty-two bit words from memory. When accelerator 120 is a target it responds to all scalar accesses or addresses in its range.

The bus structure of remote video interface system 100 may use a daisy chain priority scheme for bus arbitration. In this scheme compression/decompression accelerator 120 may request access to buses 116, 118 through nucleus gate array 121. In the preferred embodiment accelerator 120 is the last connection in the daisy chain it has the lowest priority. Thus, bursts initiated by accelerator 120 may be aborted in the middle of a burst by another device. This type of abort due to another device typically occurs when a display system controlled by nucleus gate array 121 requires display data. Under such circumstances compression/decompression accelerator 120 must relinquish buses 116, 118 before the beginning of the following cycle. Accelerator 120 later requests buses 116, 118 and, after gaining access by the normal arbitration process, resumes the interrupted burst beginning at the last address accessed.

Figure 2:
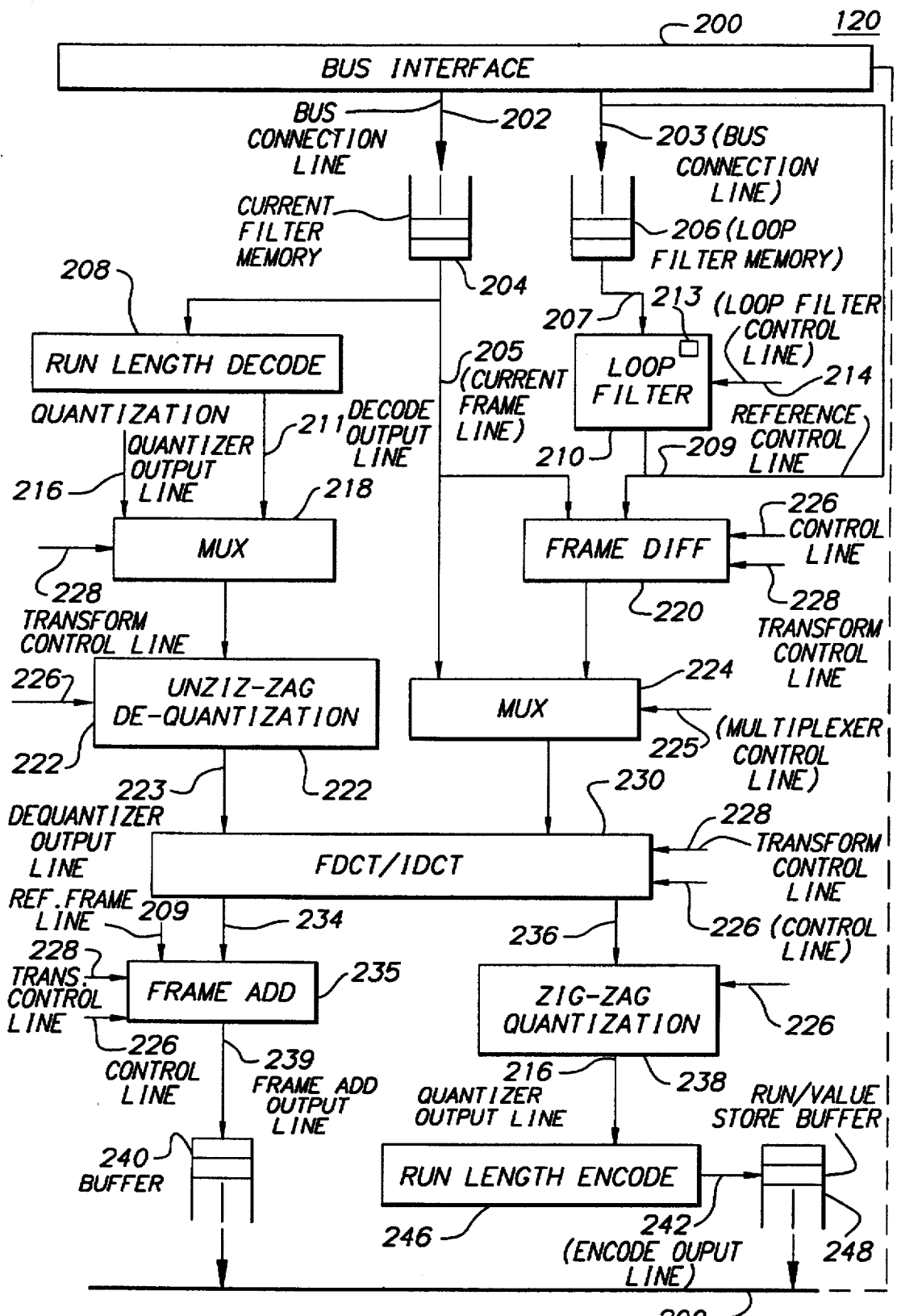
FIG. 2 shows a block diagram representation of the pipelined architecture of the system and method for accelerating the compression and decompression of video digital signals of the present invention.

Referring now to FIG. 2, there is shown a more detailed block diagram representation of compression/decompression accelerator 120 of the present invention within remote video interface system 100 having a straight pipeline architecture rather than shared resources. Compression/decompression accelerator system 120 may be selectably operated in an encode mode and in a decode mode in accordance with internally generated digital control signals. These two modes are effective to perform and thereby accelerate many encode operations and decode operations performed upon data transmitted by way of data bus 118 within video processing system 100. This assists in reaching the video data processing speeds necessary in order to perform real time video.

Data transmitted by way of data bus 118 of remote video interface system 100 is received by accelerator bus interface 200 of compression/decompression accelerator 120. All RAM within acceleration 120 must read and write by way of accelerator bus interface 200. When accelerator 120 functions in the encoder mode a previous image block, or reference frame, as received by accelerator bus interface 200 may be stored in loop filter memory 206 or previous block memory 206. This data may be applied to selectable loop filter 210 for filtering prior to being applied to frame difference block 220 depending upon whether selectable loop filter 210 is enabled. In the preferred embodiment selectable loop filter 210 may be formed of a small RAM with separate read and write ports, a three stage adder and feedback.

It will be understood that during normal operation of accelerator 120 data is constantly applied to loop filter memory 206 and constantly read from filter memory 206. Thus there is a constant flow of data from accelerating bus interface 200 to frame difference block 220. The enabling of selectable loop filter 210 is controlled by loop filter control line 214. Selectable loop filter 210 of accelerator 120, which is enabled by asserting a control signal by way of loop filter control line 214, may be a two-dimensional 1-2-1 filter applied to the interior of an eight-by-eight pixel block. In the preferred embodiment of compression/decompression accelerator 120 the filter coefficients of loop filter 210 may be as shown in Table I.

TABLE I

| 1 | 2 | 1 |
|---|---|---|
| 2 | 4 | 2 |
| 1 | 2 | 1 |

Selectable loop filter 210 may be applied to various areas of the stored image in loop filter memory 206. These areas are as shown in Table II. The outer rows and columns of an eight-by-eight pixel block from the image being filtered within loop filter 210 are filtered only in one direction except at the corners. The pixel positions receiving this filtering in only one direction are indicated by ones in Table II. The pixels at the corners of the pixel block filtered are not affected by selectable loop filter 210. This is indicated in Table II by zeros. The remaining pixels in the interior of the block are filtered in both directions. The pixels which are filtered in two directions are indicated by the twos in Table II.

TABLE II

| 0 | 1 | 1 | 1 | 1 | 1 | 1 | 0 |
|---|---|---|---|---|---|---|---|
| 1 | 2 | 2 | 2 | 2 | 2 | 2 | 1 |
| 1 | 2 | 2 | 2 | 2 | 2 | 2 | 1 |
| 1 | 2 | 2 | 2 | 2 | 2 | 2 | 1 |
| 1 | 2 | 2 | 2 | 2 | 2 | 2 | 1 |
| 1 | 2 | 2 | 2 | 2 | 2 | 2 | 1 |
| 1 | 2 | 2 | 2 | 2 | 2 | 2 | 1 |
| 0 | 1 | 1 | 1 | 1 | 1 | 1 | 0 |

The reference frame data of loop filter memory 206 is applied to frame difference block 220 by way of reference frame line 209 either with or without filtering by selectable loop filter 210. A frame subtraction is performed in difference block 220 when compression/decompression accelerator 120 performs motion estimation encoding. In the subtraction of frame difference block 220, the information of reference frame line 209 is subtracted from the current frame information on current frame line 205. The difference between the reference frame data of line 209 and the current frame data of line 205 is then provided for encoding at the output of frame difference block 220. The information regarding the current frame line is received from bus interface 200 by way of current frame memory 204 and line 202. This frame subtraction of frame difference block saturates the resulting image values to a signed number between negative and positive two hundred fifty-five.

The output of frame difference block 220 is multiplexed within transform multiplexer 224 with the information applied directly by way of line 205. Transform multiplexer 224 is controlled by multiplexer control line 225. It will be understood that the state of control line 225 depends upon whether the image block being processed is intrablock encoded or motion estimation encoded. The output of transform multiplexer 224 is then encoded by means of a forward discrete cosine transform operation performed within selectable discrete cosine transform block 230 within compression/decompression accelerator 120. Selectable discrete cosine transform block 230, or reconfigurable discrete cosine transform block 230, may perform either a forward or an inverse discrete cosine transform. The transform performed depends on the control signals applied to selectable transform block 230 by encode/decode control line 226 and forward/inverse transform control line 228.

The transformed data from selectable discrete cosine transform block 230 is then applied to zig-zag quantization block 238 for quantization in a conventional zig-zag order. It will be understood that the need for intermediate storage is eliminated by quantizing in zig-zag order rather than first arranging the data into zig-zag order and then reading the arranged data into quantization block 238. This zig-zag quantization of block 238 is performed by indexed reading of the data from the matrix of data which is being quantized. This permits true pipelining within accelerator 120.

One basic formula for quantization by quantization block 238 within compression/decompression accelerator 120 of the present invention may be:

$$\text{value} = d/(2 \times Q) \qquad \text{Equation (1)}$$

where value is the quantized value which appears on quantization output line 216 of quantization block 238, d is the input applied to quantization block 238 by selectable transform block 230, and Q is the quantization multiplier. Accelerator 120 may perform the division operation of Equation (1) by performing a table look up and providing an eight bit value R which is given by the formula:

$$R = 256/(2 \times Q)$$

Compression/decompression accelerator 120 then performs the following operation:

$$\text{value} = (d \times R) >> 8$$

If the coefficient is a DC term and the block is intrablock encoded:

$$\text{value} = 255 \text{ if } (d \text{ is } 1024)$$

else $$\text{value} = d >> 3.$$

The quantized output data from zig-zag quantization block 238 is applied by way of quantization output line 216 to run length encoder block 246 for conventional run length encoding within compression/decompression accelerator 120 in order to provide conventional run/value pairs. The run/value output of run length encoder block 246 is applied to run/value store buffer 248 by way of encoder output line 242. Transmission of run/value pairs from run/value store buffer 248 to devices external to accelerator 120 is by way of accelerator bus interface 200.

It will be understood that during the encoding process of compression/decompression accelerator 120 quantized data from quantization block 238 may also be applied by way of quantization output line 216 to dequantization multiplexer 218 and, therefrom, to zig-zag dequantization block 222. Thus quantization block 238 and dequantization block 222 are directly coupled within accelerator 120 by way of dequantization output line 216. This direct coupling permits dequantization immediately after quantization thereby avoiding the delays of run length encoding and run length decoding. Thus pixels applied to accelerator 120 may be simultaneously encoded and decoded.

The data of line 216, which was zig-zag encoded in quantization block 238, is applied to zig-zag dequantization block 222 in a sequence adapted to reestablish the order of the data prior to the zig-zag encoding. This eliminates the need for the intermediate storage which is conventionally required to hold the re-ordered data. Thus, the data which is encoded in selectable discrete cosine transform block 230 and zig-zag encoded and quantized in quantization block 238 may be immediately dequantized during the encoding process of accelerator 120 by dequantization block 222 by way of quantizer output line 216. This may be performed without intermediate zig-zag and run length encoding or decoding and without the memory storage requirements associated therewith.

The dequantization operation of dequantization block 222 may use the formula of Equations (2):

$$d = Q \times (2 \times \text{value} + \text{sign}(\text{value}) \qquad \text{Equations (2)}$$

$$d = d - \text{sign}(d) \text{ if } (d \text{ is even})$$

In this formula value is the quantized input data applied to dequantization block 222 either by multiplexer input line 216 from quantization block 238 or by multiplexer input line 211, Q is the quantization multiplier as previously described, and d is the dequantized result which appears on output line 223 of dequantization block 222.

In a case wherein the transform coefficient corresponds to a DC term and the block being dequantized within dequantization block 222 is intrablock coded, the dequantization formula is as set forth in Equations (3). The intrablock coding decision is made within processor block 112 and is communicated to dequantization block 202 by way of INTRA control line 225.

$$d = 1024 \text{ if } (\text{value is } 255)$$

else $$d = 8 \times \text{value} \qquad \text{Equations (3)}$$

The data which is dequantized within dequantization block 222 is applied to selectable discrete cosine transform block 230 by dequantization output line 223. As previously described, selectable transform block 230 is effective to selectively apply either a forward or a inverse discrete cosine transform to received signals according to transform control line 228. The inverse discrete transform is applied by selectable transform device 230 to the data received from unzig-zag dequantization block 222.

The inverse transformed signal provided by this operation is applied to frame add block 235 which also receives the reference frame data of reference frame line 209. Frame add block 235 adds back in the reference frame data value on line 209 which was subtracted out by frame difference block 220 during the encode process. The frame addition of frame add block 235 saturates its output to a value between zero and positive two hundred fifty-five. The output of frame add block 234 is stored in decoded block storage buffer 240. Data which is thus encoded and decoded within accelerator 120 is transmitted from decoded block storage buffer 240 by way of accelerator bus interface 200. Thus, while operating in the encode mode compression/decompression accelerator 120 provides both an encoded signal in buffer 248 and a decoded version of the encoded signal in buffer 240. This permits system 100 to determine the errors which are decoded by a remote system receiving the encoded data.

It will be understood that frame difference block 220 and frame add block 235 may be reconfigurations of the same circuitry within accelerator 120. Add/subtract blocks 235, 220 may be selectably provided under the control of control lines 226, 228 because they are not active at the same time and there is enough latency to allow time to reconfigure the add/subtract circuit elements within them.

When encode/decode mode control line 228 adapts compression/decompression accelerator 120 to operate in the decode mode, the data to be decoded is received from data bus 118 Of remote video processing system 100 into accelerator bus interface 200. This data to be decoded in bus interface 200 has previously been discrete cosine transformed, zig-zag encoded and run length encoded. It is therefore applied to run length decoder block 208 within accelerator 120. The run length decoded output data of decoder 208 is applied by way of decoder output line 211 and dequantization multiplexer 218 to dequantization block 222 where it is reordered to undo the effects of zig-zag encoding as previously described. Control of dequantization multiplexer 218 may be by forward/inverse transform control line 228 alone because dequantization block 222 receives only the data of quantizer output line 216 during forward transforms and only the data of decoder 208 during inverse transforms.

In order to perform the zig-zag and the unzig-zag operations of accelerator 120, blocks 222, 238 translate the row order of the transform coefficients, respectively, into the order of increasing spatial frequency. Rearranging the coefficients into this different order is a useful prelude to run length encoding because it tends to group coefficients of similar spatial frequency together. The scanning order of the coefficients used to apply data to quantization block 238 of accelerator 120 is set forth in Table III wherein a zig-zag pattern is followed from the upper left to the lower right. The run length encode process of encoder block 246 is a straight forward compression of the value string to a group of run/value pairs. The run length is calculated by counting up to but not including the value.

TABLE III

| 1  | 2  | 6  | 7  | 15 | 16 | 28 | 29 |
|----|----|----|----|----|----|----|----|
| 3  | 5  | 8  | 14 | 17 | 27 | 30 | 43 |
| 4  | 9  | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 52 | 57 | 60 | 62 |
| 36 | 37 | 49 | 50 | 58 | 59 | 63 | 64 |

Run length decoded data from run length decoder block 208 is applied by way of multiplexer input line 211 and dequantization multiplexer 218 to dequantization block 222 where it is dequantized. Dequantization multiplexer 218 may be under the control of forward/inverse transform control line 228 only as previously described. The dequantized data from dequantization block 222 is then applied to selectable discrete cosine transform block 230. Dequantization/quantization blocks 222, 238 are configured to perform the dequantization operation of block 222 under the control of encode/decode control line 226.

It will be understood that dequantization multiplexer 218 is controlled to select multiplexer input line 211 for application to selectable transform device 230 when compression/decompression accelerator 120 is operating in the decode mode and to select quantization output line 216 at the appropriate times when accelerator 120 is operating in the encode mode. Thus dequantization multiplexer 218 selects the externally encoded data from bus interface 200 when in the decode mode and the internally encoded data otherwise. This selection by multiplexer 218 is controlled by forward/reverse control line 228.

Thus, it will be understood that compression/decompression accelerator 120 is a pipelined architecture which may be divided into two parallel pathways, one form encoding and one for decoding. The encoding pathway receives a previous image and a current image into buffers 204, 206 respectively. The difference between the two may be applied by frame difference block 220 to selectable discrete cosine transform block 230. During this portion of the encode operation, discrete cosine transform device 230 operates in the forward transform mode. The remainder of this encode pathway of accelerator 120 includes blocks 238, 246, which receive transformed data from transform device 230, perform further encoding operations, and store the encoded data in buffer 248.

When compression/decompression interface 120 operates in the decode mode, the other parallel pathway of its pipeline architecture is used. This other parallel pathway includes run length decoding and dequantization in blocks 208, 222 respectively. The dequantized data is applied to discrete cosine block 230 which operates in the inverse transform mode when the decode pathway is active. The inverse transform data is frame added and stored in buffer 240.

Finally, it will be understood that data may be applied from one pathway to the other during the encode mode as previously described. This occurs when quantized data on quantizer output line 216 of the encode parallel pathway is applied to dequantization block 222 in order to provide the companded image. Thus block 238 may be substantially directly coupled to block 222 within accelerator 120. For example, blocks 222, 238 may work on the same block of physical memory within accelerator 120, with block 222 working just a few pixels behind block 238.

Figure 3A:
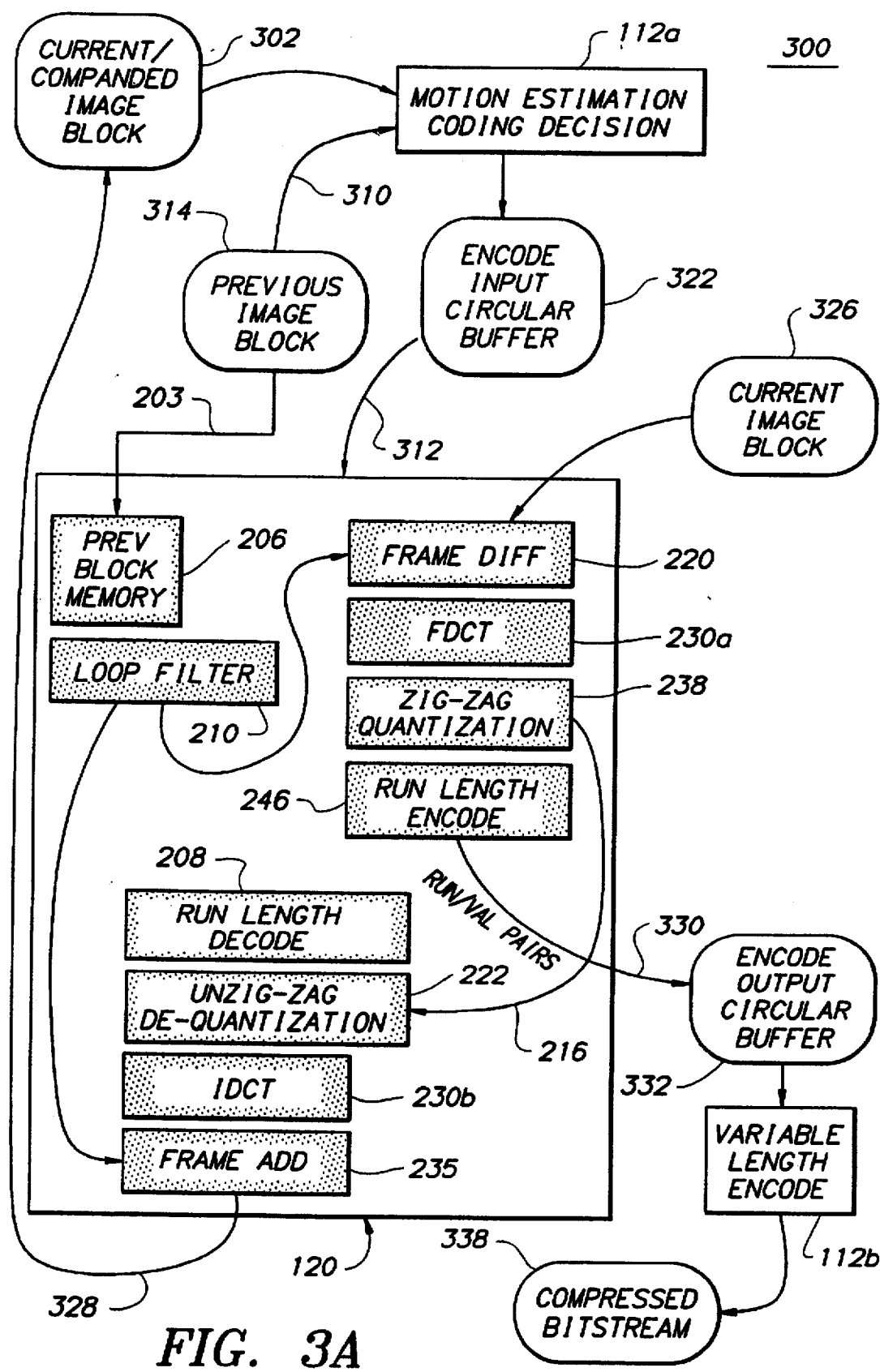
FIGS. 3A, B show a block diagram representation of the dataflow of the system and method of FIG. 2 when it is adapted to encode digital video signals and physical buffer memories for use in this process.
Figure 3B:
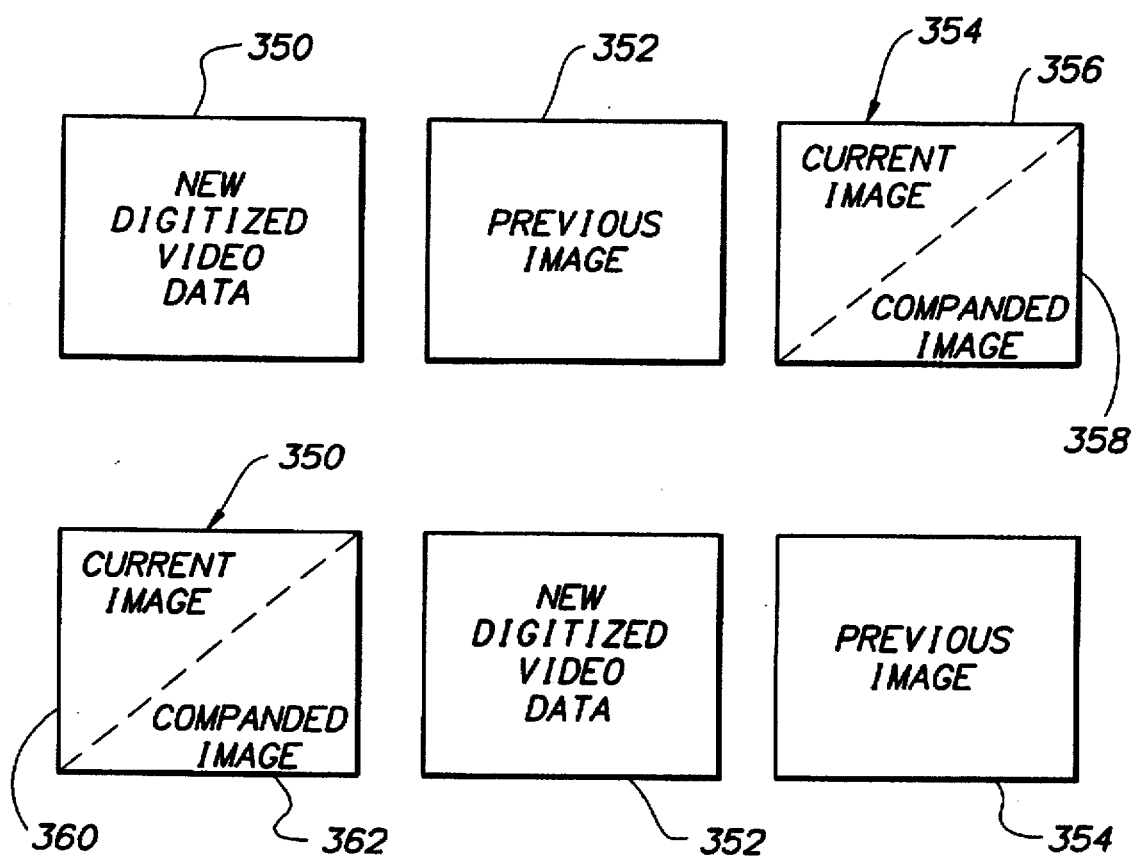

Referring now to FIGS. 3A,B, there are shown encode dataflow 300 for performing the encoding of data within compression/decompression accelerator 120 of the present invention and physical memory buffers 350, 352, 354. Within encode dataflow 300 current image block 302 is applied to motion estimation block 112a for a coding decision in order to permit system 100 to transmit as little data as possible. For this purpose, it will be understood that it is sometimes more efficient to estimate the displacement between one frame and the next and transmit only the displacement. This is understood to be motion estimation encoding. However, if there is a great deal of difference between frames, it is less efficient to transmit the displacement and the block is encoded based only upon itself. This is understood to be intrablock encoding. This determination, and therefore the determination whether to apply loop filter 210, is made by software coding decision block 112a.

Thus, within motion estimation block 112a a determination is made whether current image 302 is to receive intrablock encoding or motion estimation encoding. Execution then proceeds to compression/decompression accelerator 120 by way of line 312. If motion estimation is to be performed a pointer to the block to be encoded is stored in encode input circular buffer 322 which may be located in memory 114. Thus, it will be understood that during encode dataflow 300 pointers, rather than image data, reside in encode circular buffer 322 and that dataflow 300 represents a loosely coupled system. Within encode input circular buffer 322 a pointer to current image block 322 is stored for applying current image block 322 to compression/decompression accelerator 120 for motion estimation encoding.

Frame difference block 220 within accelerator 120 receives the previous block and the data of current image block 326. A difference is determined within frame difference block 220 as previously described. A forward discrete cosine transform is then performed on the data from frame difference block 220 in encode dataflow 300 by forward discrete cosine transform block 230a. It will be understood that the function of forward discrete cosine transform block 230a may be performed by selectable discrete cosine transform block 230 when selectable transform block 230 operates in the forward mode as determined by transform control line 228.

The transformed data from forward discrete cosine transform block 230a is received by quantization block 238 in a conventional zig-zag order as previously described and quantized therein. The quantized data from block 238 is applied by way of quantization output line 216 to run length encoder 246 for run length encoding. Run length encoding within encoder 246 provides conventional run/value pairs as known to those skilled in the art. The run/value pairs from run length encoder 246 are applied, by way of line 330, to encode output circular buffer 332.

The data within encode output circular buffer 332 is then applied to variable length encoder 112b to provide compressed bit stream 338. It will be understood that buffer 332 may be located in memory 114 and that video processor 112 may read the run/value pairs from memory 114 in order to perform the operations of variable length encoder 112b. Thus, the motion estimation decision of motion estimation block 112a and the variable length encode of variable length encoder 112b may both be performed by video processor 112 of system 100. A video processor system suitable for this purpose is the 82750 PB made by Intel Corporation.

It will thus be understood that the operations of both motion estimation block 112a and variable length encode 112b may be performed by this video processor system. Thus the functions of encode dataflow 300 are partitioned as follows: (1) the software functions including motion estimation, Huffman encoding and decoding, as well as memory management operations involving moving blocks of data into and out of memory 114, are performed by video processor 112, and (2) the functions which would be computationally intensive such as discrete cosine transforms, frame add/subtract, quantizing and dequantizing and run length encoding and decoding are hardwired in circuitry within accelerator 120. These partitioned functions of processor 112 and accelerator 120 are synchronized within remote video processing system 100.

The latter group of computationally intensive functions tend to be rather rigidly specified in current standards. Since it is not possible to change them for this reason there is little improvement in visual quality possible in these functions. However, as new algorithms or more powerful video processors become available the performance of the former group of functions may be improved relatively easily. Thus the performance of video processing system 100 may be improved without hardware redesign. Additionally, new operations may be added. For example, pre-filtering and post-filtering operations may be performed by video processor 112 if time permits.

The quantized data from quantization block 238 is also applied to dequantization block 222 by way of quantization output line 216. The data transferred in this manner within compression/decompression accelerator 120 thus bypasses both run length encoding within run length encoder block 246 and run length decoding within run length decoder block 208. Thus, the process of decoding the encoded data in order to provide a companded image may be performed without the additional memory reads and writes involved in performing run length encoding and run length decoding. These savings provide a significant advantage in real time calculations. It will be understood by those skilled in the art that the operations of run length blocks 208, 246 are not lossy operations and that their contribution to the motion estimation decoding decision of motion estimation block 112a may therefore be ignored.

Inverse discrete cosine transform block 230b applies an inverse transform to the dequantized data received from dequantization block 222. It will be understood that the operations of inverse discrete cosine transform block 230b of encode dataflow 300 may be performed by selectable discrete cosine transform block 230 when transform block 230 operates in the inverse mode under the control of transform control line 228. Thus during the encode mode of compression/decompression accelerator 120, as described by encode dataflow 300, selectable transform block 230 functions both as a forward and an inverse discrete cosine transform under the control of forward/inverse transform control line 228.

The decoded signal from inverse transform block 230b is applied to frame addition block 235, and, therefrom, to current/companded image block 302 by way of line 328. It will be understood that the signal of line 328 resulting from encoding and decoding within encode dataflow 300 of accelerator 120 is the image which is compared with the previous image of previous image block 314 in order to make the motion estimation coding decision of block 112a. A useful and advantageous feature of encode dataflow 300 is that current image 326 is overwritten by the decoded image of line 328 thereby eliminating the need for separate buffers storing the same images. Thus portions of the companded image and portions of the current image are present simultaneously in the same block of memory which may thus simultaneously perform the functions of both blocks 302, 326.

The operation of blocks 302, 326 may be better understood by reference to physical buffers memory 350, 352, 354. During operations of remote video processing system 100 digitized image data from camera 127 may be stored first in physical buffer memory 350 while physical buffer memory 352 stores the previous image. Physical buffer memory 354 stores portion 358 of the current image which is in the process of being overwritten by the companded portion 356.

When an entire digitized image is stored in buffer memory 350 and an entire companded image is stored in physical memory 354, the functions of physical buffer memories are redefined. The digitized data in physical memory 350 is used as the current image 362 which is overwritten by companded data 360. The companded data of physical memory 354 is used as the previous image for motion estimation by block 112a. New digitized data is stored in physical memory 352. This process continues with physical memory 354 next serving to collect new digitized data. In this manner three, rather than four blocks of physical memory may be used to perform these operations of encode dataflow 300.

Figure 4:
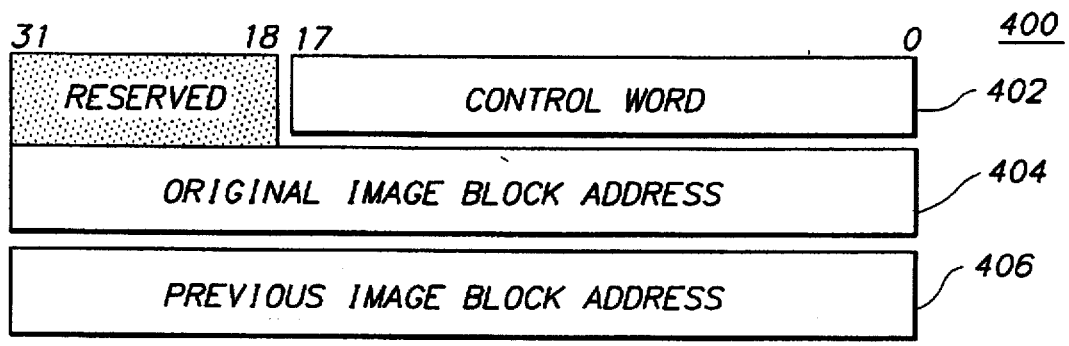
FIG. 4 shows a block diagram representation of a data structure for the input circular buffer of the encode dataflow of FIG. 3.

Referring now to FIG. 4, there is shown encode input buffer data structure 400 for controlling blocks of data stored in encode input circular buffer 322 as required within encode dataflow 300. Within encode input buffer data structure 400 control word 402 is provided. When motion estimation coding decision block 112a determines how an image should be encoded a bit within control word 402 may be used to indicate whether the block is intrablock encoded or a motion compensation encoded. Other parameters associated with each block of data may also be stored in control word 402 of data structure 400. Another example of the type of information which may be stored within control word 402 is information on whether selectable loop filter 210 is enabled or disabled. Additionally the five-bit quantization/dequantization value Q of blocks 222, 238 may be stored in control word 402 of encode input buffer data structure 400.

Encode input buffer data structure 400 also contains original image block address pointer 404. Original image block address pointer 404 points to the original location of a block of data in current image block 326. It will be understood that original image block pointer 404 also points to current/companded image block 302 when image blocks 302, 326 are in the same physical memory because the companded image received by way of line 328 overwrites the current image. Thus the image being encoded is the original image which may be the same as the current image. It will also be understood that pointer 404 points to fixed length data rather than variable length data because the image of block 302 is not yet encoded. Previous image block address pointer 406 points to the location of the previous image in block 314.

Figure 5:
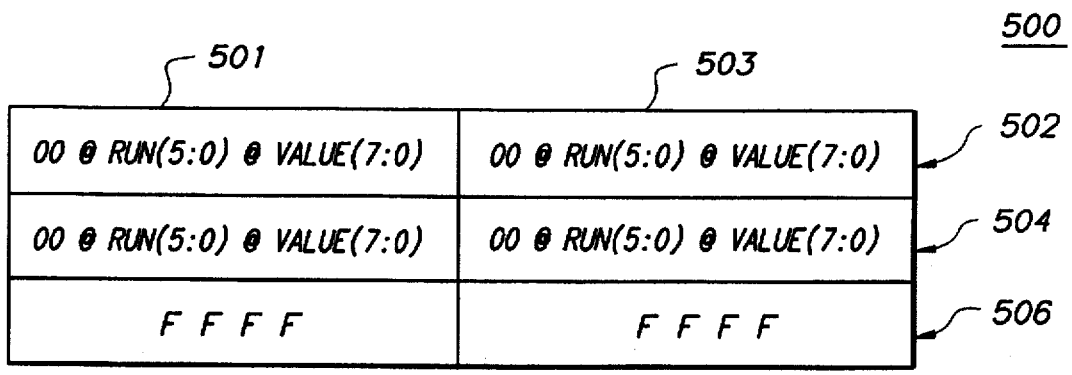
FIG. 5 shows a block diagram representation of a data structure for the output circular buffer of the encode dataflow of FIG. 3.

Referring now to FIG. 5, there is shown encode output buffer data structure 500 for encode output circular buffer 322 within encode dataflow 300. In the preferred embodiment of compression/decompression accelerator 120 two input run/value pairs such as run/value pairs 501, 503 may be stored in a thirty-two bit double word of input circular buffer 322, such as double words 502, 504. Double word 506 of input circular buffer 322 is filled with ones to indicate the end of a list of run/value pairs. When there is an odd number of run/value pairs in the list of buffer data structure 500 one word of double word 506 may be used to store a run/value pair and the remaining word may be filled with ones to indicate the end of the list.

Figure 6:
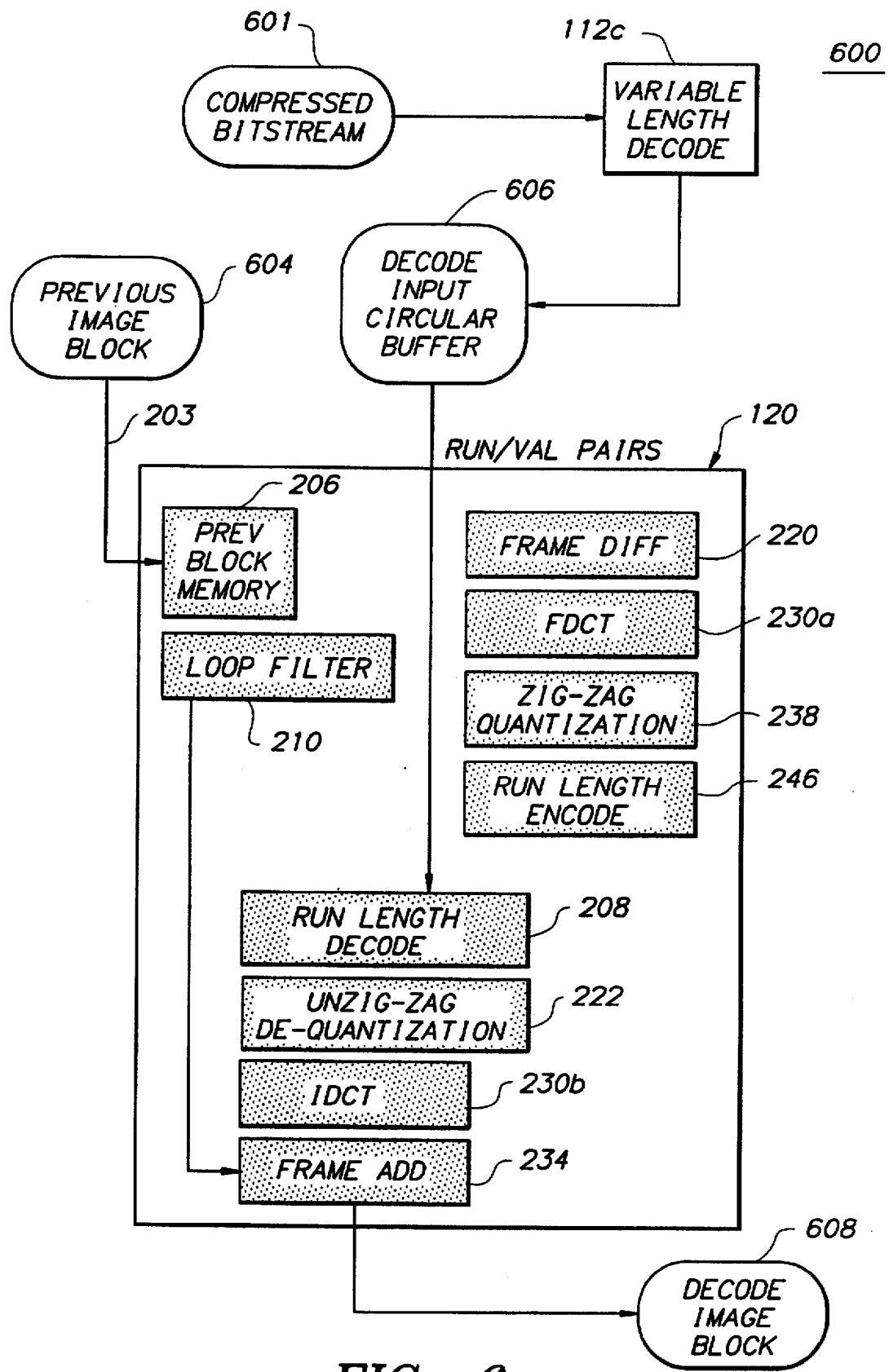
FIG. 6 shows a block diagram representation of the dataflow of the system and method of FIG. 2 when it is adapted to decode digital video signals.

Referring now to FIG. 6, there is shown decode dataflow 600 using compression/decompression accelerator 120 of the system of the present invention. Compressed bit stream 601 is received and decompressed within decode dataflow 600. Compressed bit stream 601 may be a bit stream such as compressed bit stream 338 provided by encode dataflow 300 of the present invention. A variable length decode is performed upon received bitstream 338 by variable length decoder 112c. It will be understood that variable length decoder 112c of decode dataflow 600 and variable encoder 112a of encode dataflow 300 may be performed by a single dual purpose encoding and decoding device within video processing system 100 such as processor block 112. The decoded data of variable length decoder 602 is then placed into decode input circular buffer 606 of decode dataflow 600.

Frame difference block 220, forward discrete cosine transform 230a, quantization block 246 and run length encoder 246 are not used within compression/ decompression accelerator 120 when acceleration 120 operates in the decode mode. When operating in the decode mode accelerator 120 receives the data for decoding according to decode dataflow 600 from decode input circular buffer 606. In particular, run length decoder 208 of accelerator 120 receives the data from circular buffer 606. The data decoded within run length decoder 208 is then applied to dequantization block 222 for a dequantization within accelerator 120. This data is applied to dequantization block 222 in an order which is adapted to restore the sequence of the data prior to zig-zag encoding by a zig-zag encoder within an external device which transmits encoded data to accelerator 120.

An inverse discrete cosine transform is applied to the dequantized data of block 222 by inverse discrete cosine transform block 230b. It will be understood that the operations of inverse discrete cosine transform block 230b within decode dataflow 600 may be performed by selectable transform block 230 when selectable transform block 230 is in the inverse mode as determined by transform control line 228.

Previous image block 604 is received by compression/ decompression accelerator 120 by way of line 203. The received previous image block 604 is stored in previous block memory 206 within accelerator 120. If selectable loop filter 210 is enabled under the control of filter control line 214 the image in previous block memory 206 is filtered and applied to frame add block 234. If selectable loop filter 210 is not enabled the image within previous block memory 206 is applied directly to frame add block 234. When the previous image block 604, as received from previous block memory 206, and the dequantized transformed current image block are added in frame add block 234, the output of block 234 is stored in decoded image block 608.

Figure 7:
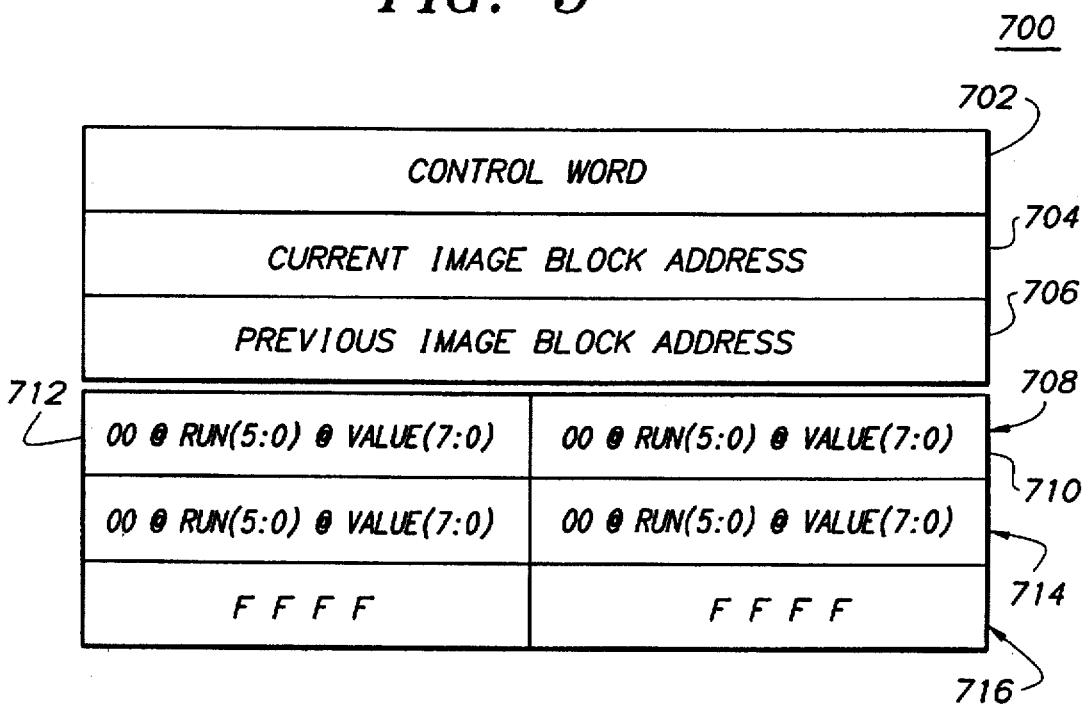
FIG. 7 shows a block diagram representation of a data structure for the input circular buffer of the decode dataflow of FIG. 6.

Referring now to FIG. 7, there is shown decode input circular buffer data structure 700 for decode input circular buffer 606 of decode dataflow 600. It will be understood that the data of decode input circular buffer 606 is variable length data if Huffman encoding is performed before transmission to buffer 606. Decode input buffer data structure 700 contains control word 702 which may be used to store the quantization/dequantization value Q as well as information regarding whether selectable loop filter 210 is enabled or disabled. Additionally control word 702 may contain information regarding whether the image block being decoded by decode dataflow 600 is a intracoded block or a motion compensated block. Current image block address 704 of data structure 700 points to the beginning of a current image and previous image block 706 points to the previous image.

Additionally, in the preferred embodiment of data structure 700 two run/value pairs, such as run/value pairs 710, 712, may be stored in each of a number of double words such as double words 708, 710. Double word 716 of circular buffer 606 is filled with ones to indicate the end of the list of run/value pairs. If there is an odd number of run/value pairs in the list of pairs, one word of double word 716 may be used to store a run/value pair and the remaining word may be filled with ones to indicate the end of the list.

It will be understood that motion estimation coding decision block 112a performs the motion estimation process within encode dataflow 300. Additionally it performs the variable length encode of the local image and the variable length decode of remote compressed bit stream 601. Thus, the functions of block 112a may be performed by a general purpose video processor such as video processor 112. Compression/decompression accelerator 120 of the present invention performs all of the remaining functions of encode dataflow 300 and decode dataflow 600.

Video processor 112 and accelerator 120 of remote video processing system 100 operate substantially independently of each other. However, they tend to work from common areas of memory to implement operations such as accesses to the various circular buffers. The manner in which the work load of remote video processing system 100 is partitioned between video processor 112 and compression/ decompression accelerator 120 minimizes the overhead required for synchronization of the various dataflows such as dataflows 300, 600. Nevertheless, some possibilities for conflict still exist within video processing system 100. Thus, there must be a method within video processing system 100 to manage memory such that buffer overflows and underflows due to conflicts between video processor 112 and accelerator 120 are avoided.

In order to minimize costly fine tuning of synchronization within remote video interface system 100 a pointer interlock scheme is used for reading and writing the run/value data in encode dataflow 300 and decode dataflow 600. To implement this scheme both an encode synchronization and a decode synchronization are provided within remote video processing system 100 containing compression/ decompression accelerator 120.

Figure 8:
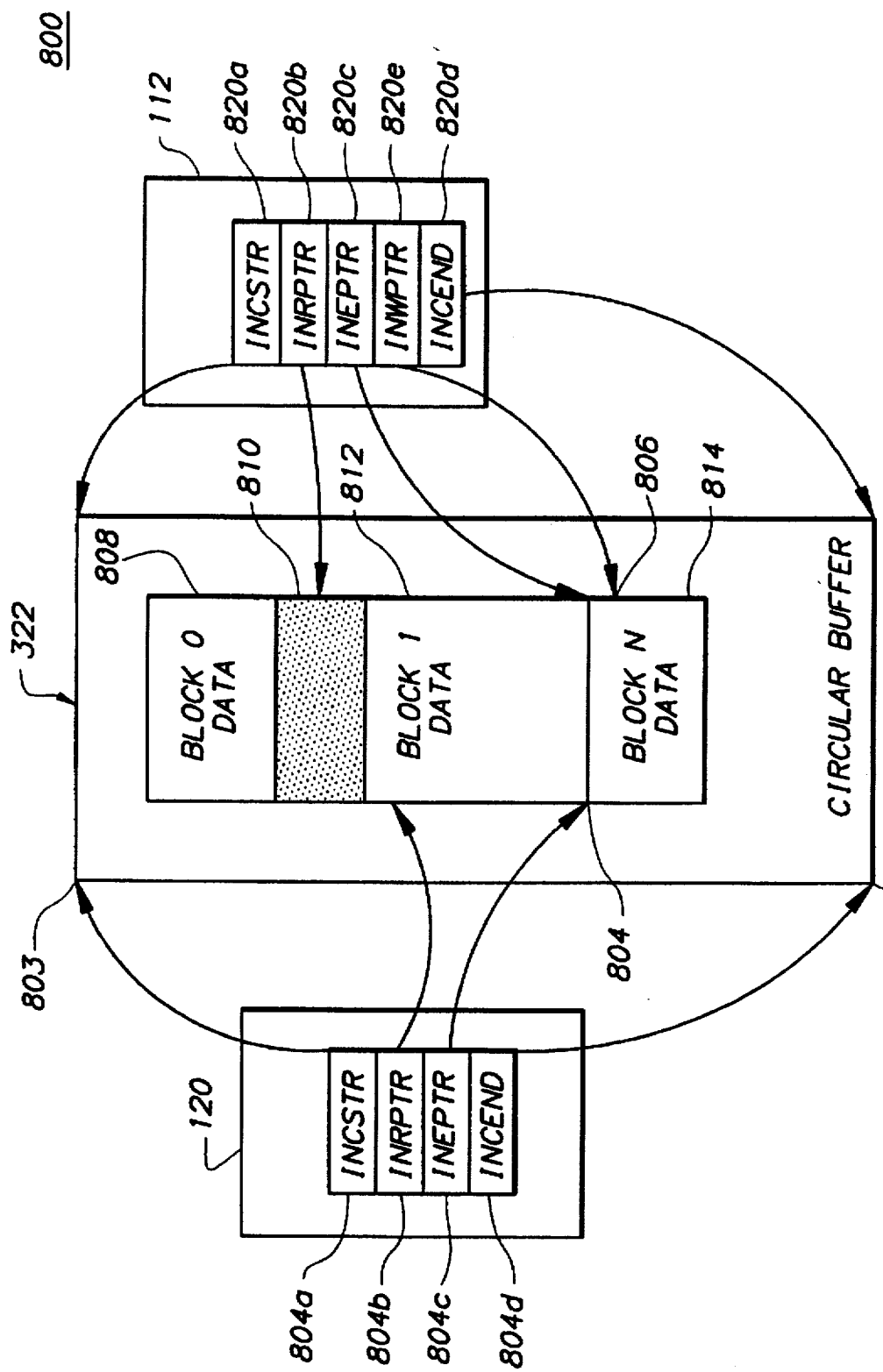
FIG. 8 shows a block diagram representation of a process flow for synchronizing the motion estimation and the encoding process in the system and method of FIG. 2 as well as buffer pointers related thereto.
Figure 9:
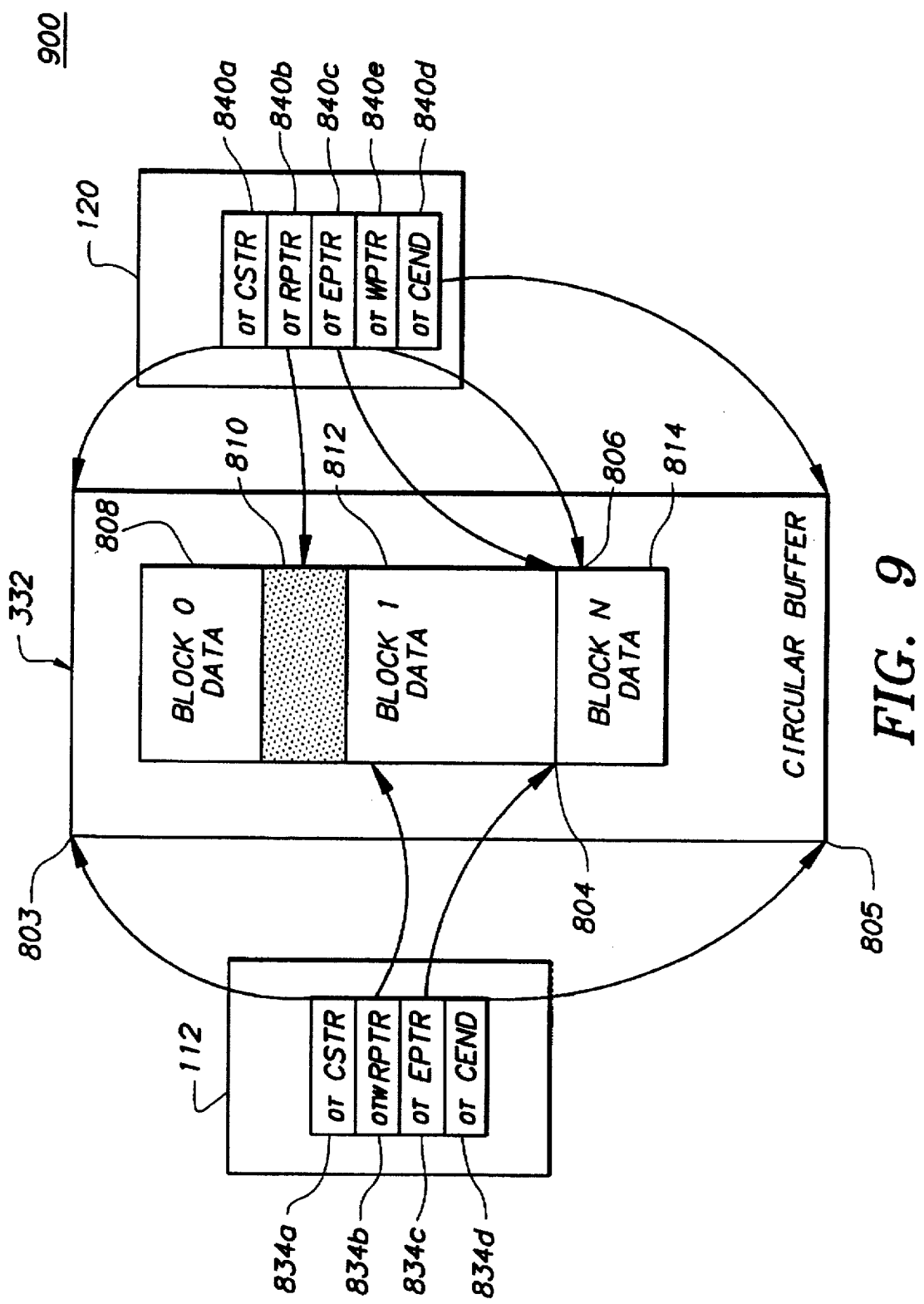
FIG. 9 shows a block diagram representation of a process flow for synchronizing the decoding process in the system and method of FIG. 2 as well as buffer pointers related thereto.

Referring now to FIGS. 8, 9, there are shown input circular buffer synchronization flow 800 and output circular buffer synchronization flow 900, as well as various buffer pointers for use in circular buffer synchronization flows 800, 900. It will be understood that video processor 112 of remote video interface system 100 controls synchronization of access to buffers 322, 332 within remote video processing system 100 buffers in accordance with input/output synchronization flows 800, 900. During the encoding process of encode dataflow 300 compression/decompression accelerator 120 reads block lists of uncompressed image data from encode input circular buffer 322. Accelerator 120 also writes compressed data in the form of run/value pairs into encode output circular buffer 332 within dataflow 300 as previously described. Access by accelerator 120 to the physical memory storing circular buffers 322, 332 must be synchronized in order to avoid conflicts.

Therefore, in order to avoid conflicts, whenever a reset or some other initial condition occurs within video processor 112 and compression/decompression accelerator 120 first the pointers of one pair of input buffer pointers are set equal to each other and then the pointers of a second pair of output buffer pointers are set equal to each other. Accelerator INRPTR pointer 804b, which indicates the next location from which accelerator 120 will read input circular buffer 322, is set equal to accelerator INEPTR pointer 804c, which indicates the next location after end location 804 of current input list 812.

Compression/decompression accelerator 120 then sets the two output buffer pointers equal to each other. Accelerator OTWPTR pointer 830c, which indicates the next location to which accelerator 120 will write in output circular buffer 322, is set equal to the value of accelerator OTEPTR pointer 830e, which indicates the location after the end of the current output list.

The beginning and the end of both the current input list are thus equal to each other and the beginning and end of the current output list are thus equal to each other. This defines their stall condition. Therefore, processing by compression/decompression accelerator 120 within encode dataflow 300 is suspended. It should be noted, however, that bus interface 200 of accelerator 120 may continue to operate because accelerator 120 may be a target in a bus transaction of remote video interface system 100. However, accelerator 120 does not initiate any transactions in this suspended state.

After the above pairs of buffer printers are set equal to each other, video processor 112 defines the areas of encode input circular buffer 322 and encode output circular buffer 332. These buffers are defined by setting a series of memory mapped pointers within compression/decompression accelerator 120 using scalar memory write operations. These pointers include accelerator INCSTR pointer 804a and accelerator INCEND pointer 804d which indicate the location after beginning address 803 and the location after ending address 805, respectively, of encode input circular buffer 322. Additionally, accelerator pointers OTCSTR 840a, OTCEND 840d are set by video processor 112.

It will be understood that video processor 112 must set accelerator pointers 804a,c,d equal to processor pointers 820a,c,d so that accelerator 120 and block 112 may agree regarding where circular buffer 322 begins and ends and where current list 812 ends. Thus, for example, after video processor 112 writes one or more blocks of data, and updates its own write pointer 820e in a post increment manner, it updates accelerator pointer INCEND 804d.

Processor INWPTR pointer 820e indicates location 806 within buffer 322. Location 806 is the location to which video processor 112 is writing and it has no corresponding pointer within compression/decompression accelerator 120 because accelerator 120 does not write to buffer 322. Accelerator INRPTR 804b and processor INRPTR 820b within video processor 112 indicate the next location at which accelerator 120 will read input circular buffer 322 and thus will differ from each other.

Processor block 112 then starts motion estimation and block classification on each block of pixels in accordance with the determinations previously described with respect to encode dataflow 300. Video processor 112 then writes the pointers associated with each block of externally stored image data into input circular buffer 322, starting with the address indicated by INWPTR pointer 820e.

In the case of a decode of a remote bitstream 601, compression/decompression accelerator 120 reads input data from decode input circular buffer 606 and writes reconstructed data into a frame memory such as decoded image block 608. Under initial conditions, including a reset, accelerator 120 sets two input buffer pointers equal to each other. Accelerator INRPTR pointer 804b, which indicates the position from which accelerator 120 is reading input circular buffer 606, is set equal to accelerator INEPTR pointer 804c, which represents the end of the current input list.

Video processor 112 then defines the areas of encode input circular buffer 606 and encode output circular buffer 608 by setting a series of memory mapped pointers on compression/decompression accelerator 120 using scalar memory write operations. This may be the only time when video processor 112 writes to accelerator 120. These pointers include INCSTR pointer 804a and INCEND pointer 804d which indicate the beginning and ending addresses, respectively, of encode input circular buffer 322. Video processor 112 then starts the variable length decode process on the compressed data and writes the run/value block data to the circular buffer area.

When enough data is written into the buffer area, processor 112 updates both INEPTR pointers 804c, 820c in compression/decompression accelerator 120 and in processor 112. INEPTR pointers 804c, 820c point to the location after the last location of the data in the buffer area. In general the flow pointers of synchronization flows 800, 900 are incremented after a read or a write and thus point to the next location to be read or written. Compression/decompression accelerator 120 then begins to fetch data at the location programmed into accelerator INRPTR pointer 804b and continues up to but not including the location programmed into accelerator INEPTR pointer 804c. When INRPTR pointer 804b equals INEPTR pointer 804c, compression/decompression accelerator 120 stops processing.

INRPTR pointer 804b wraps around to pointer INCSTR 804a when it reaches the address programmed into accelerator INCEND pointer 804d. Video processor 112 is responsible for maintaining both INEPTR pointers 804c, 820c. Compression/decompression accelerator 120 is responsible for maintaining accelerator INRPTR pointer 804b. Video processor 112 updates its copy of INRPTR pointer 820b by reading accelerator INRPTR pointer 804b within compression/decompression accelerator 120.

Video processor 112 may write additional blocks into input circular buffer 322 by writing the data then updating accelerator INEPTR pointer 804c. When video processor 112 writes this data, accelerator INRPTR pointer 804c is also read. This is required in order to prevent video processor 112 from overwriting areas of the circular buffer. This defines the stall condition for a device writing into the circular buffer when its read and write pointers are the same. It will be understood that it is also the responsibility of video processor 112 to update the pointers of accelerator 120 during output to output circular buffer 332. Accelerator 120 updates its own end pointer and write pointer and video processor 112 must read the updated pointers.

Figure 10:
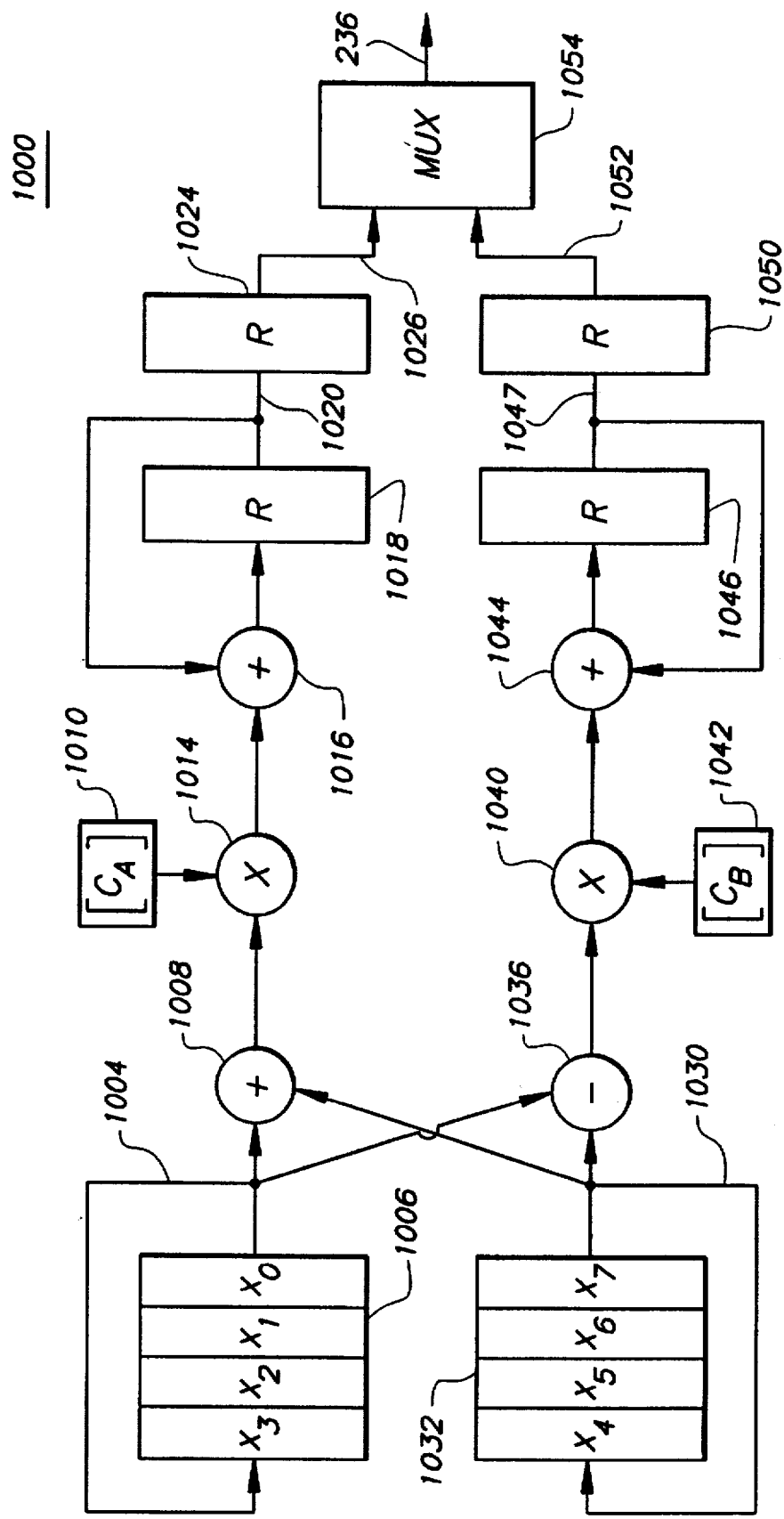
FIG. 10 shows a block diagram representation of the forward discrete cosine transform computation flow of the encoding portion of the system of FIG. 3.
Figure 11:
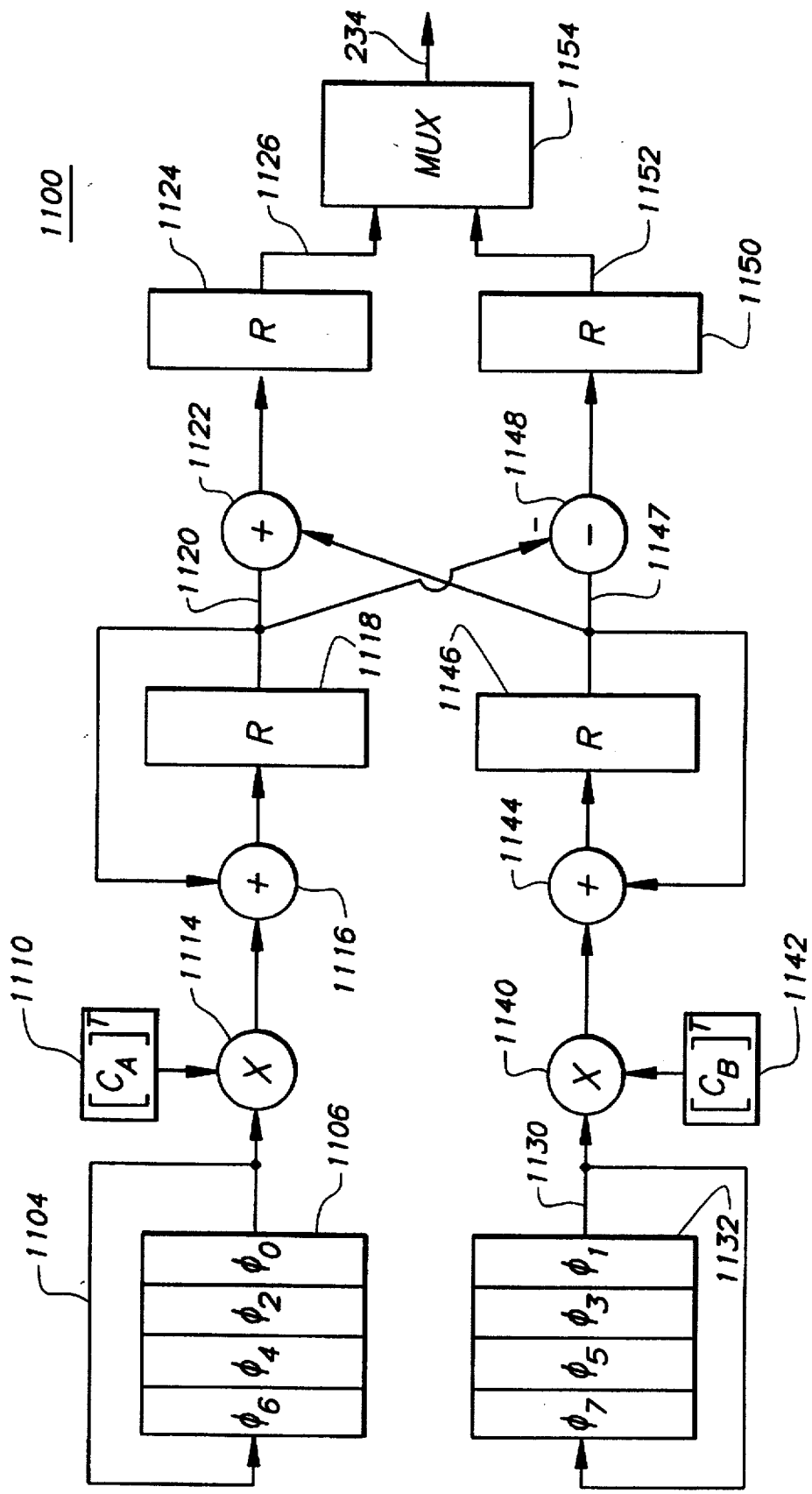
FIG. 11 shows a block diagram representation of the inverse discrete cosine transform computation flow of the decoding portion of the system of FIG. 3.

Referring now to FIGS. 10, 11, there are shown forward discrete cosine transform computation flow 1000 and inverse discrete cosine transform computation flow 1100 of the present invention. Discrete cosine transform computation flows 1000, 1100 may be performed by transform blocks 230a,b respectively of dataflows 300, 600. Additionally discrete cosine transform computation flows 1000, 1100 may be performed by selectable transform block 230 under the control of forward/inverse transform control line 228.

The operation of forward discrete cosine transform computation flow 1000 as performed by transform block 230a of encode dataflow 300 or selectable discrete cosine transform block 230 of compression/decompression accelerator 120 may be expressed as shown in Equation (4):

$$[\Phi]=[C][X].  \quad\text{Equation (4)}$$

In Equation (4) matrix [X] is the input data matrix applied to transform block 230 or transform block 230a, matrix [C] is the discrete cosine transform matrix, and matrix [Φ] is the transformed output matrix which is applied to transform output line 236 by transform block 230.

Inverse discrete cosine transform computation flow 1100 as performed by transform block 230 or by selectable discrete cosine transform block 230 under the control of transform control line 228 may be expressed shown in Equation (5):

$$[X]=[C]^T[\Phi].  \quad\text{Equation (5)}$$

In Equation (5) matrix [Φ] is the transformed input matrix received by way of transform input line 223, matrix [X] is the output matrix applied to transform output line 234, and matrix $[C]^T$ is the inverse discrete cosine transform matrix.

The individual coefficients $c_m$ of the discrete cosine transform matrix [C] may be expressed as:

$$c_{m,n}=\sqrt{\frac{1}{n}}\left[k_m\cos\frac{m\pi(2n+1)}{2N}\right].  \quad\text{Equation (6)}$$

In Equation (6) N is the order of the discrete cosine transform performed within transform computation flows 1000, 1100 and m and n are the row and column indices, respectively, of the discrete cosine transform matrix [C] wherein m and n have the values 0, 1, 2, . . . , N-1. The constant $k_m$ has a value of one divided by the square root of two if the row index m has a value of zero. The constant $K_m$ has the value of one if the row index m is not zero.

Solving Equation (6) when the order N of the discrete cosine transform is eight yields the following discrete cosine transform coefficients $c_m$:

$$c_o = 1/\sqrt{2}  \quad\text{Equations (7)}$$

$$c_m = \cos\frac{m\pi}{16}\ \text{for}\ m=1,2,\ldots,7$$

Under these circumstances the discrete cosine transform matrix [C] of Equation (4) may be formed in accordance with Equation (6) and Equations (7) as follows:

$$[C]=\frac{1}{2}\begin{bmatrix} c_0 & c_0 & c_0 & c_0 & c_0 & c_0 & c_0 & c_0 \\ c_1 & c_3 & c_5 & c_7 & -c_7 & -c_5 & -c_3 & -c_1 \\ c_2 & c_6 & -c_6 & -c_2 & -c_2 & -c_6 & c_6 & c_2 \\ c_3 & -c_7 & -c_1 & -c_5 & c_5 & c_1 & c_7 & c_3 \\ c_4 & -c_4 & -c_4 & c_4 & c_4 & -c_4 & -c_4 & c_4 \\ c_5 & -c_1 & c_1 & c_3 & -c_3 & -c_7 & c_1 & -c_5 \\ c_6 & -c_2 & c_2 & -c_6 & -c_6 & c_2 & -c_2 & c_6 \\ c_7 & -c_5 & c_3 & -c_1 & c_1 & -c_3 & c_5 & -c_7 \end{bmatrix}$$

It will be understood that eight multiply/accumulate operations are required to perform this transform for each data point within input data matrix [X]. Therefore 64×8=512 multiply/accumulate operations are required for a one-dimensional discrete cosine transform. For a two-dimensional discrete cosine transform 1024 multiply/accumulate operations are required.

Several fast prior art algorithms are known for performing the forward and inverse discrete cosine transforms of Equation (4) and Equation (5). Using certain of these prior art methods an eight point discrete cosine transform may be performed with twelve multiplies and twenty-nine adds. Thus a total of one hundred ninety-two multiplications and four hundred sixty-four additions are required thereby simplifying the operation of these transforms. These algorithms are better suited for parallel operation.

Forward discrete cosine transform flow 1000 of the present invention executes a fast forward discrete cosine which is a faster and more efficient variation of the transform represented by Equation (4). In forward discrete cosine transform flow 1000, the order N of the transform is eight. It will be understood by those skilled in the art that the transform performed by forward transform flow 1000 is a fast forward transform of the type described with respect to transform block 230a. It is performed by selectable discrete cosine transform block 230 when selectable transform block 230 is in the encode mode. This fast forward transform may be expressed as:

$$\begin{bmatrix}\phi_0\\\phi_2\\\phi_4\\\phi_6\end{bmatrix}=\frac{1}{2}\begin{bmatrix} A & A & A & A \\ B & C & -C & -B \\ A & -A & -A & A \\ C & -B & B & -C \end{bmatrix}\begin{bmatrix}x_0+x_7\\x_1+x_6\\x_2+x_5\\x_3+x_4\end{bmatrix}=\frac{1}{2}[C_A][X']$$

$$\begin{bmatrix}\phi_1\\\phi_3\\\phi_5\\\phi_7\end{bmatrix}=\frac{1}{2}\begin{bmatrix} D & E & F & G \\ E & -G & -D & -F \\ F & -D & G & E \\ G & -F & E & -D \end{bmatrix}\begin{bmatrix}x_0-x_7\\x_1-x_6\\x_2-x_5\\x_3-x_4\end{bmatrix}=\frac{1}{2}[C_B][X'']$$

Equations (8)

wherein the elements of submatrices $[C_A]$ and $[C_B]$ are obtained from the discrete cosine transform matrix using sparse matrix factorization techniques known to those skilled in the art and the coefficients of Equations (8) are given by:

$A = \cos\frac{\pi}{4}$　　$E = \cos\frac{3\pi}{16}$ $B = \cos\frac{\pi}{8}$　　$F = \sin\frac{3\pi}{16}$ $C = \cos\frac{\pi}{8}$　　$G = \sin\frac{\pi}{16}$ $D = \cos\frac{\pi}{16}$ The elements of vectors [X'] and [X"] or submatrices [X'] and [X"] are formed by respectively adding and subtracting the high order data points of matrix [X] and the low order data points of matrix [X].

Transform computation flow 1000, performed by selectable discrete cosine transform block 230, is effective to receive the input data matrix [X] and apply the forward discrete cosine transform matrix [C] to input data matrix [X] to provide the forward transformed matrix [Φ] as set forth in Equation (4) and Equations (8). In order to perform these operations the low order data points $x_0$–$x_3$ of an input word x are selected to form a subword. These data points may be any number of bits wide. The data points of this subword are placed into circular input registers 1006. Similarly, the high order data points $x_4$–$x_7$ of the input word are selected to form another subword. The data points of this subword are placed into circular input registers 1032.

As data points $x_0$–$x_3$ are successively applied to addition node 1008 and subtraction node 1036 they are also applied to the input of circular registers 1006 by way of a loop formed by register output line 1004. Similarly, data points $x_4$–$x_7$ are successively applied to the input of circular registers 1032 by way of a loop formed by register output line 1030 as they are applied to addition node 1008 and subtraction node 1036.

The timing of the presentation of each of these data points is controlled in a manner understood by those skilled in the art to provide the sums $x_0+x_7$, $x_1+x_6$, $x_2+x_5$, and $x_3+x_4$, which are the elements of submatrix [X'] of Equations (8), at the output of addition node 1008. In a similar manner the differences $x_0-x_7$, $x_1-x_6$, $x_2-x_5$, $x_3-x_4$, which are the elements of submatrix [X"] of Equations (8), are formed at the output of subtraction node 1036. It will be understood that, acting cooperatively, register output lines 1004, 1030 and nodes 1008, 1036 operate as a conventional butterfly adder operating upon a series of pairs of input data points. In a conventional butterfly adder, two inputs are received and two outputs are provided, one output being the sum of the inputs, the other the difference. In the case of flow 1000, these inputs proceed through input circular buffers 1004, 1032 to produce the values of submatrices [X'] and [X"]. The output of nodes 1008, 1036 are then successively applied to multiplication nodes 1014, 1040 within transform computation flow 1000.

The coefficients of submatrix [$C_A$] are applied to submatrix [X'] received by multiplication node 1014 from addition node 1008 for multiplication within node 1014 in accordance with Equations (8). The coefficients of the submatrix [$C_A$] are applied to multiplication node 1014 by coefficient register 1010. The matrix partial product terms thus formed by multiplication node 1014 are then applied to addition node 1016 within transform computation flow 1000.

In a similar manner submatrix [X"] received by multiplication node 1040 from subtraction node 1036 is multiplied within node 1040 by the coefficients of submatrix [$C_B$] in accordance with Equations (8). The coefficients of submatrix [$C_B$] are applied to multiplication node 1040 by coefficient register 1042. The matrix partial product terms thus formed by multiplication node 1040 are applied to addition node 1044 within transform computation flow 1000.

The sums formed by addition nodes 1016, 1044 are applied to register blocks 1018, 1046, respectively, within forward discrete cosine transform computation flow 1000. The outputs of register blocks 1018, 1046 are applied back to addition nodes 1016, 1044, respectively, by way of register output lines 1020, 1047 causing delayed terms to be summed with terms nearby received by nodes 1016, 1044. This permits transform computation flow 1000 to perform the additions of the partial product terms as required by the matrix algebra operations of Equations (8).

The output of register blocks 1018, 1046 are also applied to register blocks 1024, 1050, respectively, within forward transform computation flow 1000 which may be implemented by selectable discrete cosine transform block 230. It will be understood that the output of register block 1024, which appears on register output line 1026, is the set of even numbered transformed data points $\phi_6$, $\phi_4$, $\phi_2$, $\phi_0$ of Equations (8). Additionally, it will be understood that the output of register block 1050, which appears on register output line 1052, is the set of odd numbered transformed data points $\phi_5$, $\phi_3$, $\phi_1$ of Equations (8). The values of register output lines 1026, 1052 are applied to flow output multiplexer 1054 in order to be multiplexed, reordered and applied by way of the forward flow output line 236. It is believed that performing a fast forward discrete cosine transform using the system and method of computation flow 1000 provides a transformed output signal several clock cycles faster than the known prior art.

In this manner the transform of computation flow 1000 may be performed by applying a single multiplier 1014, 1040 to each of the outputs of circular buffers 1006, 1032 as the data circulates from one end into the other by way of the loops of lines 1004, 1030. It will be understood that the data must circulate through circular buffers 1006, 1030 once for each pair of output data points from buffers 1006, 1032.

In a similar manner inverse discrete cosine transform computation flow 1100 of the present invention executes a fast inverse discrete cosine transform wherein the order N of the transform is eight. It will be understood by those skilled in the art that the transform performed by forward transform computation flow 1100 is the type of transform performed by selectable discrete cosine transform block 230 when transform block 230 is in the decode mode. This inverse discrete cosine transform matrix $[C]^T$ may be mathematically expressed as:

$$\begin{bmatrix} x_0 \\ x_1 \\ x_2 \\ x_3 \end{bmatrix} = \frac{1}{2}[C_A]^T \begin{bmatrix} \phi_0 \\ \phi_2 \\ \phi_4 \\ \phi_6 \end{bmatrix} + \frac{1}{2}[C_B]^T \begin{bmatrix} \phi_1 \\ \phi_3 \\ \phi_5 \\ \phi_7 \end{bmatrix} =$$

Equations (9)

$$\frac{1}{2}[C_A]^T[\phi'] + \frac{1}{2}[C_B]^T[\phi'']$$

$$\begin{bmatrix} x_7 \\ x_6 \\ x_5 \\ x_4 \end{bmatrix} = \frac{1}{2}[C_A]^T \begin{bmatrix} \phi_0 \\ \phi_2 \\ \phi_4 \\ \phi_6 \end{bmatrix} - \frac{1}{2}[C_B]^T \begin{bmatrix} \phi_1 \\ \phi_3 \\ \phi_5 \\ \phi_7 \end{bmatrix} =$$

$$\frac{1}{2}[C_A]^T[\phi'] - \frac{1}{2}[C_B]^T[\phi'']$$

wherein the submatrices $[C_A]^T$ and $[C_B]^T$ are obtained from the discrete cosine transform matrix using sparse matrix factorization techniques.

Computation flow 1100 of selectable discrete cosine transform block 230 is effective to receive an inverse transformed matrix [Φ] and apply an inverse discrete cosine transform matrix $[C]^T$ to provide an output data matrix [X]. Computation flow 1100 is adapted to be a much faster variation of the transform set forth in Equation (4) and Equations (9). In order to perform these operations the even transformed data points $\phi_0, \phi_2, \phi_4, \phi_6$, of the values of transformed matrix [Φ] are placed in circular input registers 1106 and the odd transformed data points $\phi_1, \phi_3, \phi_5, \phi_7$ reside in circular input registers 1132.

As even transformed data points $\phi_0, \phi_2, \phi_4, \phi_6$ residing in circular input registers 1104 are applied to multiplication node 1114 they are simultaneously applied to the input of circular registers 1106 by register output line 1104. As odd numbered transformed data points $\phi_1, \phi_3, \phi_5, \phi_7$, of circular input registers 1132 are applied to multiplication node 1140 they are also simultaneously applied back to the input of circular registers 1130 by way of a loop formed by register output line 1130.

The value applied to multiplication node 1114 from input registers 1106 is multiplied within multiplication node 1114 by the coefficients of submatrix $[C_A]^T$ in accordance with Equations (8). The coefficients submatrix $[C_A]^T$ are applied to multiplication node 1114 by coefficient register 1110. The product formed by multiplication node 1114 is then applied to addition node 1116.

In a similar manner the value received by multiplication node 1140 from input registers 1130 is multiplied within node 1140 by the coefficients of submatrix $[C_B]^T$ in accordance with Equations (8). The coefficients of submatrix $[C_B]^T$ are applied to multiplication node 1140 from coefficient register 1142. The product thus formed by multiplication node 1140 is applied to addition node 1144.

The sums formed by addition nodes 1116, 1144 are applied to register blocks 1118, 1146, respectively, within inverse discrete cosine transform computation flow 1100. The outputs of register blocks 1118, 1146 are applied back to addition nodes 1116, 1144 by way of register output lines 1120, 1147. In this manner, the various partial product terms of Equations (9) may be provided within transform computation flow 1100.

The output of register blocks 1118, 1146 are also applied to both addition node 1122 and subtraction node 1148 by way of register output lines 1120, 1147. In this manner the combinations of the partial product terms required by the matrix algebra of Equations (9) may be performed. The outputs of addition node 1122 and subtraction node 1148 are then applied to register blocks 1124, 1150, respectively, within inverse transform computation flow 1100 which may be implemented by selectable discrete cosine transform block 230.

It will be understood that the output of register block 1124, which appears on register output line 1126, includes the low order bits $x_0, x_1, x_2, x_3$ of Equations (9). Additionally, it will be understood that the output of register block 1150, which appears on line 1152, includes the high order data points $x_4, x_5, x_6, x_7$ of Equations (9). The values of lines 1126, 1152 are applied to output multiplexer 1154 in order to be multiplexed and reordered to be applied to frame add 235 by way of output line 234.

Figure 12:
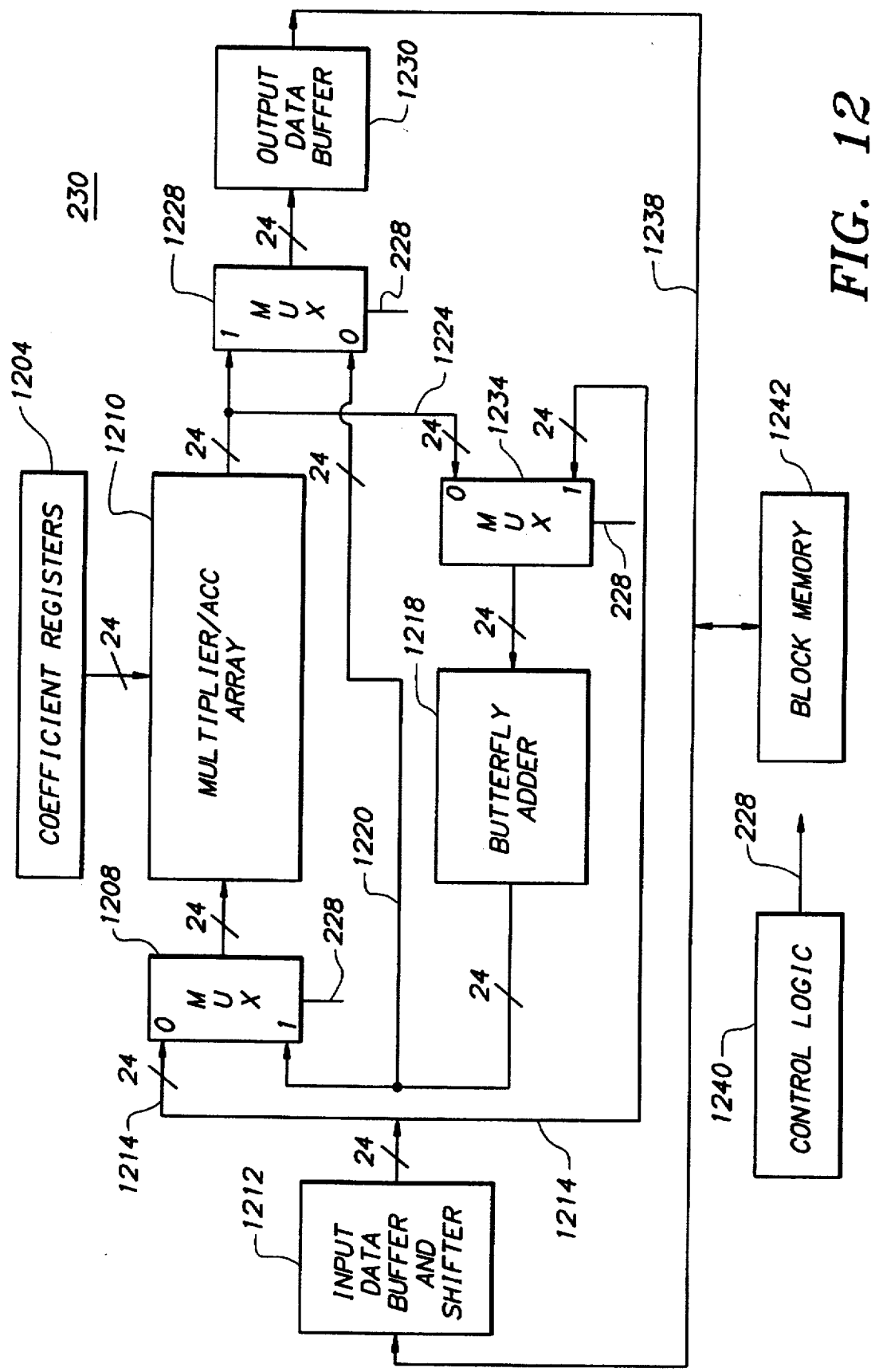
FIG. 12 shows a block diagram representation of a device for selectably performing either the forward discrete cosine transform of FIG. 10 on the inverse discrete cosine transform of FIG. 11.

Referring now to FIG. 12, there is shown a block diagram representation of selectable discrete cosine transform block 230 of compression/decompression accelerator 120. It will be understood that selectable discrete cosine transform block 230 is effective to perform the operations of both forward discrete cosine transform computational flow 1000 and inverse discrete cosine transform computational flow 1100 depending upon the control signal applied by way of transform control line 228.

When compression/decompression accelerator 120 performs the operations of encode dataflow 300, selectable transform block 230 performs both the operations of forward transform block 230a and inverse transform block 230b. Which transform is performed depends on whether the data of multiplexer 224 is being encoded or the data of dequantizer 222 is being decoded. It is the operations upon the data of multiplexer 224 which are represented by forward discrete cosine transform computational flow 1000. When performing the operations of encode dataflow 300 relevant to inverse block 230b compression/decompression accelerator 120 provide both an encoded data stream and an image representative of the decoding of the encoded data stream. When accelerator 120 performs the operations of decode dataflow 600, selectable discrete cosine transform block 230 performs the operations of inverse transform block 230b as described with respect to inverse computational flow 1100. These selectable forward and inverse transform operations are determined by the signal applied to selectable transform block 230 by way of transform control line 228 as previously described.

Within selectable discrete cosine transform block 230 data from block memory 1242 is applied by way of data bus 1238 to input data buffer/shifter 1212. Input data buffer/shifter 1212 is effective to arrange and order input data either as shown with respect to input circular registers 1006, 1032 during a forward transform or as shown with respect to input circular buffers 1106, 1132 during an inverse transform. This arranging and ordering of the input data thus provides input matrices [X'] and [X"] of Equations (8) or input matrices [Φ'] and [Φ"] of Equations (9) depending upon whether a forward transform or an inverse transform is performed by selectable discrete cosine transform block 230.

The correctly ordered output of input data buffer/shifter 1212 is applied by way of line 1214 to multiplexers 1208, 1234. Multiplexers 1208, 1234 are controlled by transform control line 228 which selects the encode and decode modes of selectable transform block 230 as previously described. The signal of transform control line 228 is determined according to control logic 1240. Control logic 1240 provides a logic level representative of the operating mode of compression/decompression accelerator 120 according to determinations made by processor block 112 in a manner understood by those skilled in the art.

When selectable transform block 230 is in the inverse mode, transform control line 228 causes array input multiplexer 1208 to select the data of multiplexer line 1214 and apply the data of line 1214 to multiplier/accumulator array 1210. Thus the input data from buffer/shifter 1212 is applied substantially directly to multiplexer/accumulator array 1210 when selectable transform block 230 is in the decode mode. The coefficient matrices $[C_A]^T$ and $[C_B]^T$ are then applied to array 1210 from coefficient registers 1204 in order that array 1210 may perform the operations of Equations (9) as previously described with respect to inverse computation flow 1100. Transformed data in output data buffer 1230 may be transmitted to block memory 1242 by way of bus 1238.

When selectable discrete cosine transform block 230 is in the encode mode, the data selected by array input multiplexer 1208 to be applied to multiplier/accumulator array 1210 is the data on multiplexer input line 1220 rather than the data on multiplexer input line 1214. The data on multiplexer input line 1220 is the output of butterfly adder 1218 or add/subtract device 1218. Butterfly adder receives as its input either (1) the data from input data buffer/shifter 1212 by way of line 1214, or (2) the output of multiplier/accumulator array 1210. Which of these two data streams is applied to butterfly adder 1218 is determined by multiplexer 1234 under the control of transform control line 228.

Thus the operations performed upon input data by selectable transform block 230 prior to multiplication by the transform coefficients, as previously described with respect to addition node 1008 and subtraction node 1036, may be performed within selectable transform block 230 when selectable transform block 230 is in the forward mode. This also performs the operations of the feedback loops formed by register output lines 1020, 1046 as well as addition nodes 1016, 1044.

It will therefore be seen that the arithmetic operations of butterfly adder 1218 may be applied directly to the input data points provided by buffer/shifter 1212. Alternatively, adder 1218 may be applied to the input data points provided by buffer/shifter 1212 after the input has been operated upon by the transform coefficients of array 1210. Which of these configurations is provided depends on whether selectable transform block 230 is in the mode for performing a first discrete cosine transform or the inverse of the first discrete cosine transform. It will also be seen that in either mode all functional elements within transform block 230 are used and there is thus no wasted hardware.

For example, the same hardware elements within transform block 230 may serve both as registers 1006 and as registers 1106, as registers 1032 and registers 1132. These registers together may form buffer 1212. Similarly, the same hardware elements within transform block 230 may serve both as adder 1008 and as adder 1122, as subtractor 1036 and subtractor 1148. These arithmetic elements operating cooperatively may serve as butterfly adder 1218. Likewise coefficient matrices $[C_A]$ and $[C_B]^T$ may be the same hardware circuitry which is merely accessed differently depending on the mode of selectable transform block 230.

Thus selectable transform block 230 requires two multipliers and four adders to perform either the forward or inverse discrete cosine transform. Either of these transforms can be performed by transform block 230 in sixteen clock cycles. It will be understood that this time may be cut in half by providing two multipliers to operate upon the outputs of each buffer 1106, 1132 or each buffer 1006, 1032. However the size of the resulting transform circuit would be twice as large.

Figure 13:
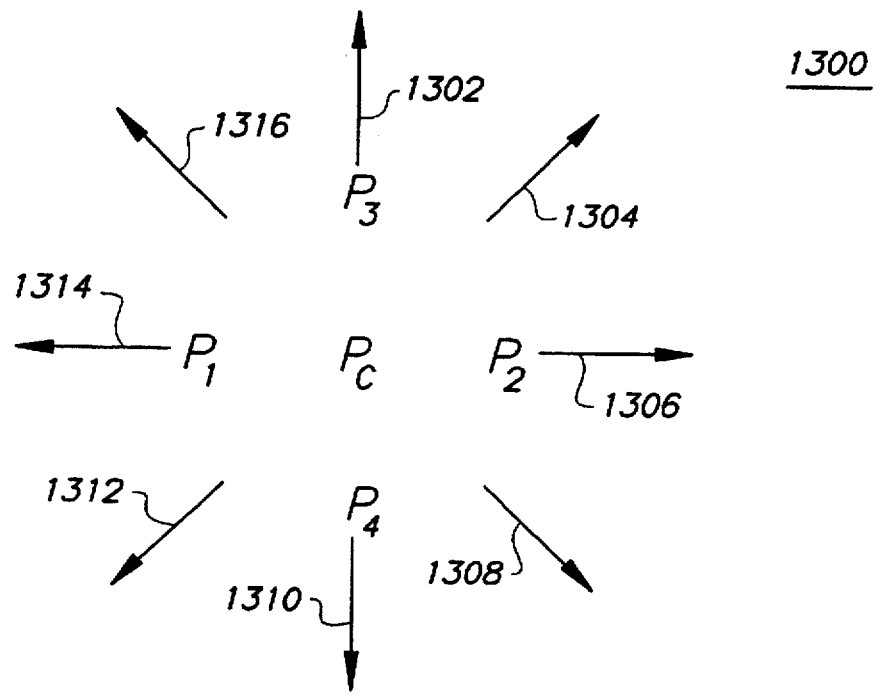
FIG. 13 shows an arrangement of positions which may be selected by the motion estimation method represented by the flowcharts of FIGS. 14A-C.

Referring now to FIG. 13, there is shown stepping direction chart 1300. Stepping direction chart 1300 represents a center position $P_c$ surrounded by four positions $P_1$–$P_4$ along with a plurality of stepping directions 1302–1316. Stepping directions 1302–1316 represent the directions that positions $P_c$, $P_1$–$P_4$ may move from one frame to another frame during a display of remote video processor system 100. For example, if positions $P_c$, $P_1$–$P_4$ of stepping direction chart 1300 move directly upwards from one frame to the next, stepping direction 1302 represents their displacement. If positions $P_c$, $P_1$–$P_4$ move directly to the right, their motion is represented by stepping directions 1306. Stepping direction 1304 represents the motion of position $P_c$, $P_1$–$P_4$ when the positions of stepping direction chart 1300 move to the upper right. In the manner, eight different directions are represented by stepping directions 1302–1316 of stepping direction chart 1300.

Figure 14C:
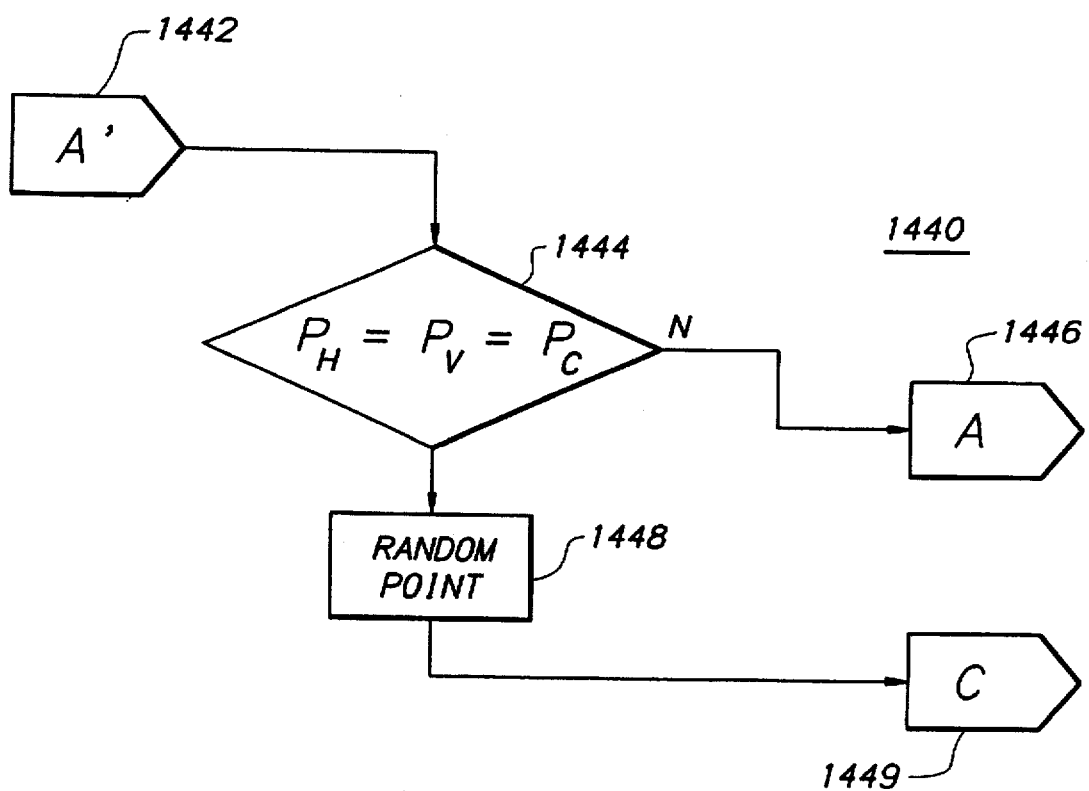
FIGS. 14A-C show flowchart representations of a motion estimation method and an alternate embodiment thereof for use in the dataflow of FIG. 3.
Figure 14A:
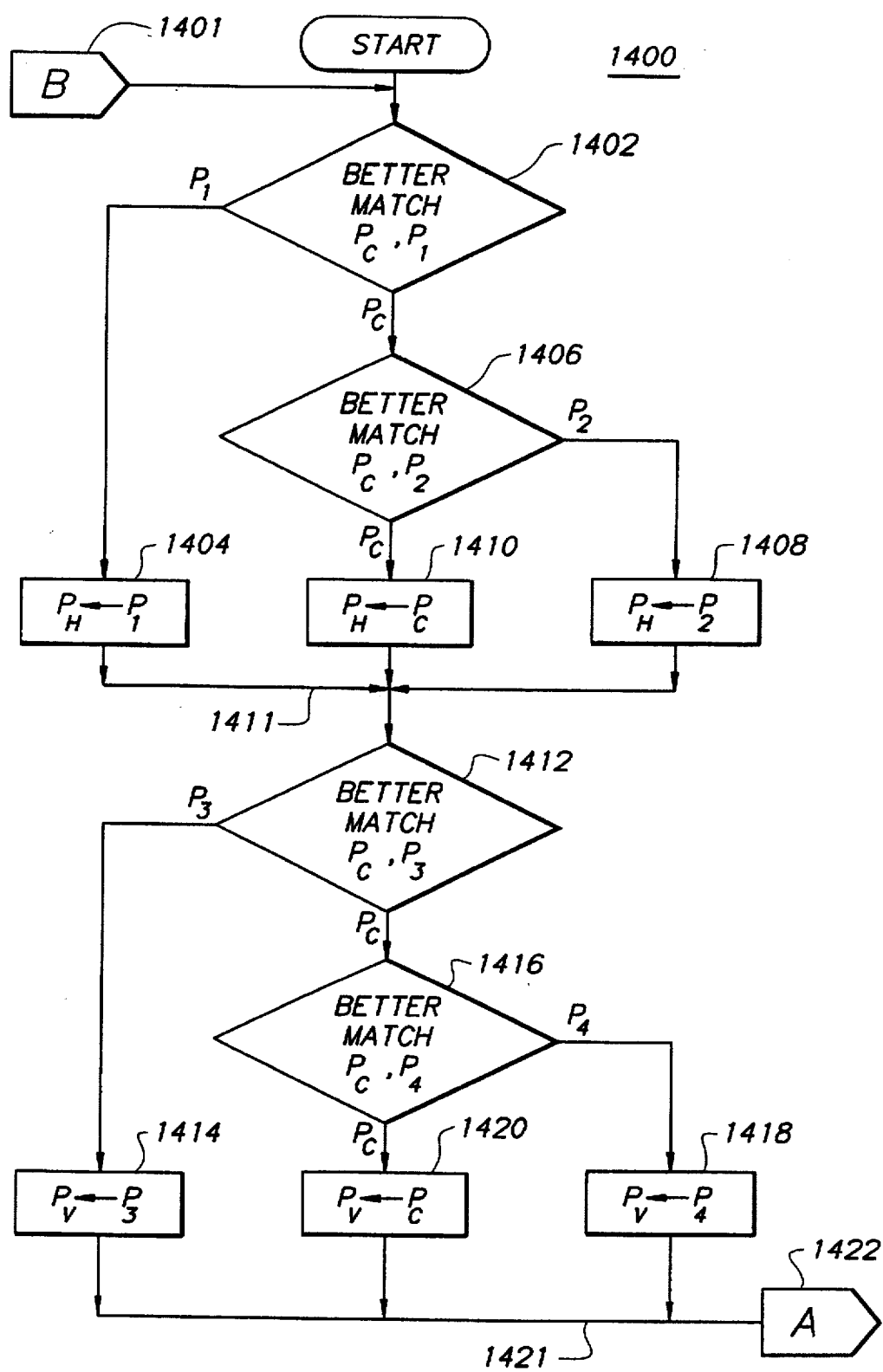
Figure 14B:
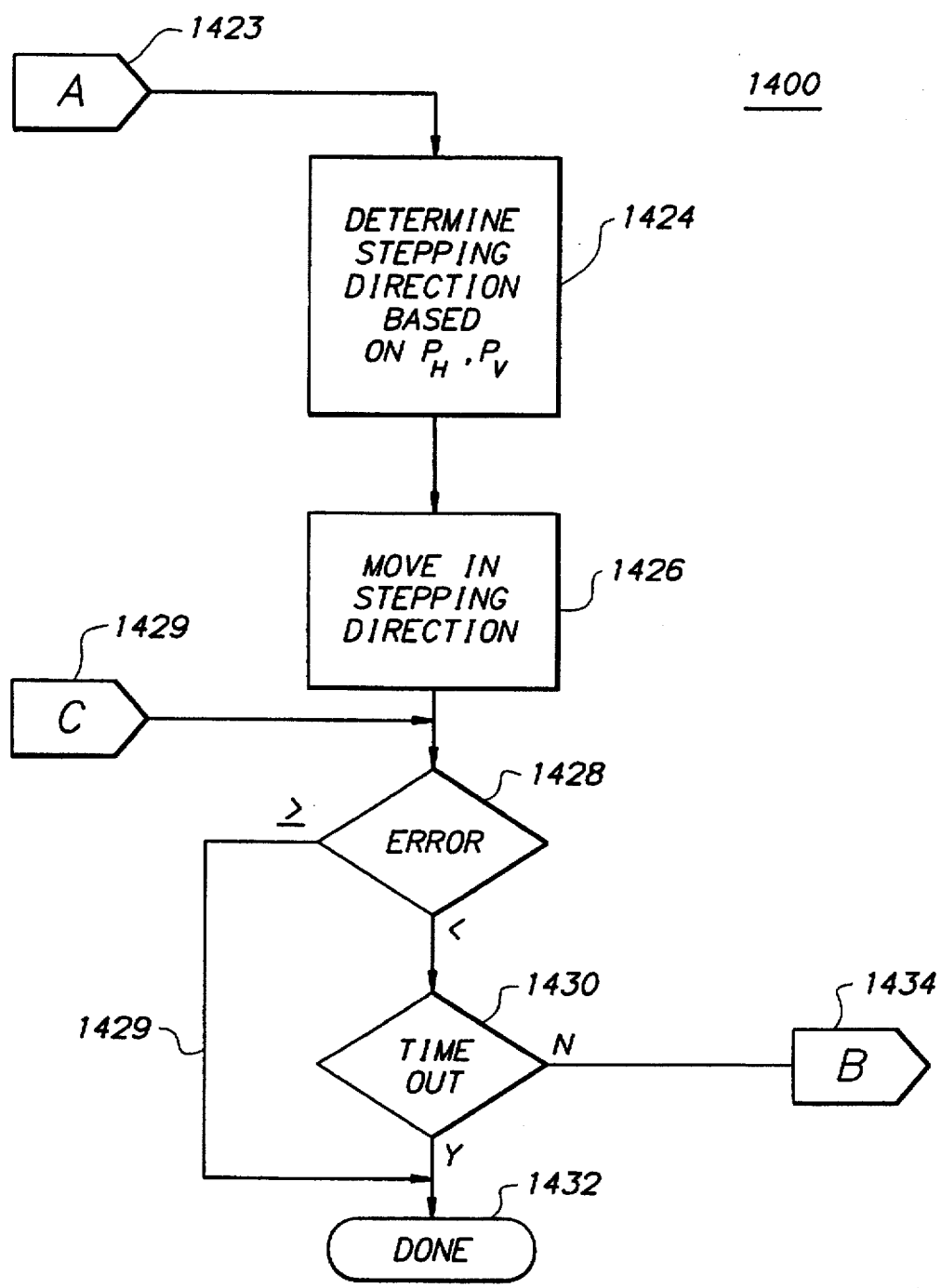

Referring now to FIGS. 14A–C, there is shown a flow chart representation of motion estimation method 1400. Also show is a representation of motion estimation method 1440 which is an alternate embodiment of motion estimation method 1400. The function of motion estimation methods 1400, 1440 is finding the best match for a target region during a predetermined period of time. Motion estimation methods 1400, 1440 may be applied to positions $P_c$, $P_1$–$P_4$ of motion vector chart 1300 to determine which stepping direction 1302–1316 best represents the motion of positions $P_c$, $P_1$–$P_4$ from one frame to another. It will be understood that both motion estimation methods 1400, 1440 may be used in encoding dataflow 300 of remote video processing system 100 of the present invention.

Operation of motion estimation method 1400 begins with a determination in decision 1402 whether center position $P_c$ or position $P_c$ of the current frame is a better match with the center position of the previous frame. This determination, as well as the determination of each of the remaining candidate positions tested in method 1400, requires a comparison of two hundred fifty-six pixels values of a sixteen-by-sixteen pixel block in the preferred embodiment of encode dataflow 300. If position $P_1$ is a better match than center position $P_c$ the best horizontal position $P_H$ is determined to be position $P_1$ as shown in block 1404 by motion estimation method 1400.

If position $P_1$ is not a better match than position $P_c$ a determination is made in decision 1406 whether position $P_2$ is a better match with the center position of the previous frame than center position $P_c$ of the current frame. If position $P_2$ is a better match than center position $P_c$ the best horizontal position $P_H$ is made equal to position $P_2$ as shown in block 1408. If neither position $P_1$ nor position $P_c$ is a better match than center position $P_c$ then center position $P_c$ is selected as the best horizontal position $V_H$ as shown in block 1410. Thus, when operation of motion estimation method 1400 arrives at point 1411, a determination has been made which of the three horizontal positions $P_c$, $P_1$, $P_2$ of the current frame has the greatest improvement from the center position. The best horizontal position $P_H$ is the one determined to be the best match.

A determination is then made within motion estimation method 1400 whether position $P_3$ is a better match than center position $P_c$ in decision 1412. If position $P_3$ is a better match it is selected as the best vertical position $P_v$ as shown in block 1414. If position $P_3$ is not a better match than center position $P_c$ a determination is made in decision 1416 whether position $P_4$ is a better match than center position $P_c$. If position $P_4$ is a better match, as determined in decision 1416, it is selected as the best vertical position $P_v$ as shown in block 1418. If neither position $P_3$ nor position $P_4$ 1416, is a better match than center position $P_c$, as determined in decisions 1412, center position $P_c$ is selected as the best vertical position $P_v$ as shown in block 1420. Thus, when operation of motion estimation method 1400 arrives at point 1421 the best vertical position $P_v$ has been set equal to either center position $P_c$, position Ps or position $P_4$. Operation of motion estimation method 1400 then proceeds, by way of off-page connector 1422, to on-page connector 1423.

When execution of motion estimation method 1400 arrives at block 1424, by way of off-page connector 1422 and on-page connector 1423, a stepping direction 1302–1316 is determined by motion estimation method 1400. This stepping direction 1302–1316 is based upon best horizontal position $P_H$, as determined by blocks 1404, 1408, 1410 depending on whether the best horizontal match is position $P_c$, $P_1$ or $P_2$. Additionally, the stepping direction 1302–1316 determined in block 1424 is based upon the best vertical position $P_v$ as determined in blocks 1414, 1418, 1420 depending on whether the best vertical match was position $P_c$, $P_3$ or $P_4$.

For example, if the best horizontal position $P_H$ selected by motion estimation method 1400 in decision 1402 is position $P_1$ and the best vertical position $P_v$ is center position $P_c$, as determined in block 1420, the stepping direction 1302–1316 determined in block 1424 is stepping direction 1314. This results from horizontal motion to the left and no vertical motion. If, for example, position $P_1$ is selected in decision 1402 and position $P_4$ is selected as the best vertical position $P_v$ in decision 1426, stepping direction 1312 is determined in block 1424. This results from horizonal motion to the left and downward vertical motion.

If center position $P_c$ is determined to be both the best horizontal position $P_H$ and the best vertical position $P_v$ within motion estimation method 1400, it will be understood that the best match from one frame to the next may be achieved with no motion. This indicates no motion of positions $P_c$, $P_1$–$P_4$ from one frame to the next. Thus there are nine possible outcomes of motion estimation method 1400 even though only eight stepping directions 1302–1316 are defined. The selection of stepping direction 1302–1316, in accordance with best vertical positions $P_v$ and best horizontal position $V_H$, is set forth in Table VI.

TABLE VI

| $P_v$ | $P_H$ | Stepping Direction |
|---|---|---|
| $P_c$ | $P_c$ | N/A |
| $P_c$ | $P_1$ | 1314 |
| $P_c$ | $P_2$ | 1306 |
| $P_3$ | $P_c$ | 1302 |
| $P_3$ | $P_1$ | 1316 |
| $P_3$ | $P_2$ | 1304 |
| $P_4$ | $P_c$ | 1310 |
| $P_4$ | $P_1$ | 1312 |
| $P_4$ | $P_2$ | 1308 |

When stepping direction 1302–1316 is determined in block 1424 of motion estimation method 1400, the operation of motion estimation method 1400 includes movement in the direction of stepping direction 1302–1316 formed therein as shown in block 1426. A determination is then made in decision whether the movement indicated in block 1426 results in an improvement in the least mean square error from one frame to the next. If no improvement is obtained, it may be determined that the least mean square error has been minimized and that the best match has been found. When the best match has been found, as indicated by decision 1428, execution of motion estimation method 1400 proceeds to end terminal 1432 by way of path 1429. At this point motion estimation method 1400 may have determined the minimum error between the image to be matched and the reconstructed image.

If movement in the direction indicated stepping direction 1302–1316 as determined in block 1424 results in improvement of the match between frames, as indicated for example by determining the least mean square error, a determination is made in decision 1430 whether motion estimation method 1400 has timed out. The time out duration of decision 1430 may be based upon a predetermined number of processor cycles or upon a predetermined amount of time during which video processing system 100. This predetermined number of processor cycles is the number allotted for video processor 112 to search for the best match between the images of one frame and another. During this predetermined duration, motion estimation method 1400 may literatively approach the best match.

If the best match occurs prior to the time out execution leaves motion estimation method 1400 as previously described. However, if the time out occurs while the match is still improving no more iterations of method 1400 are permitted and execution of method 1400 proceeds to end terminal 1382. Thus motion estimation 1400 continues to search for the best match only until the time out occurs. It will be understood that the duration of time out decision 1430 may be dynamically adjusted according to how busy video processor 112 is. It will also be understood that the time out test of decision 1430 may be performed along with any type of motion estimation method or any type of method or system for finding a best match. It may be used with various different search strategies which may maximize or minimize various correlation functions.

If the match between frames continues to improve and there is more time to search for the best match, as determined in decisions 1428, 1430, execution of motion estimation method 1400 proceeds by way of off-page connector 1434 to on page connector 1401. From on-page connector 1401, motion estimation method again searches for the best horizontal match $P_H$, in decisions 1402, 1406, and the best vertical match $P_v$, in decisions 1412, 1416, as previously described. When best horizontal and vertical positions $P_H$, $P_v$ are determined by decisions 1402, 1406, 1412, 1416, a new stepping direction 1302–1316 is determined in block 1424 and a determination is again made whether movement in the direction indicated by new stepping direction 1302–1316 results in an improvement.

Motion estimation method 1440 is an alternate embodiment of motion estimation method 1400 as previously described. In this alternate embodiment of motion estimation method 1400, execution proceeds from off-page connector 1422 to on-page connector 1442 of method 1440. When execution of motion estimation method 1440 proceeds by way of on-page connector 1442, a determination is made in decision 1444 whether center position $P_c$ provides the best match in both the horizontal and vertical directions.

If the determination of decision 1444 is affirmative, this is an indication that no motion vector 1302–1316 provides an improvement. In this case no further searching is performed in motion estimation method 1400. However, it is possible that motion estimation method 1400 has found a local minimum error which is a worse match than some other undetermined local minima. Therefore, in alternate embodiment motion estimation method 1440, a random point is selected in block 1448. Motion estimation method 1400 is then applied beginning at this random point.

Thus, after the random point is selected in block 1448, execution proceeds from alternate embodiment 1440, by way of off-page connector 1449, to on-page connector 1429 of motion estimation method 1400. At this point, a determination is made whether movement to the random point selected in block 1448 provides an improvement in decision 1428.

A pseudocode representation of motion estimation method 1400 is shown in Table VII. In the pseudocode of Table VII execution proceeds from the time out check to the beginning of the routine to permit continued stepping in a direction which causes an improved match until no more improvement results.

TABLE VII

START:

Try $P_1$
If $P_1$ is worse than $P_c$
   try $P_2$

TABLE VII-continued

Try P$_3$
If P$_3$ is worse than P$_c$
  try P$_4$

Determine a stepping direction from
  best of P$_1$, P$_2$, P$_c$
  best of P$_3$, P$_4$, P$_c$ Step in stepping direction until
  no more improvement with time out
  check.

Go to START

---

Figure 15:
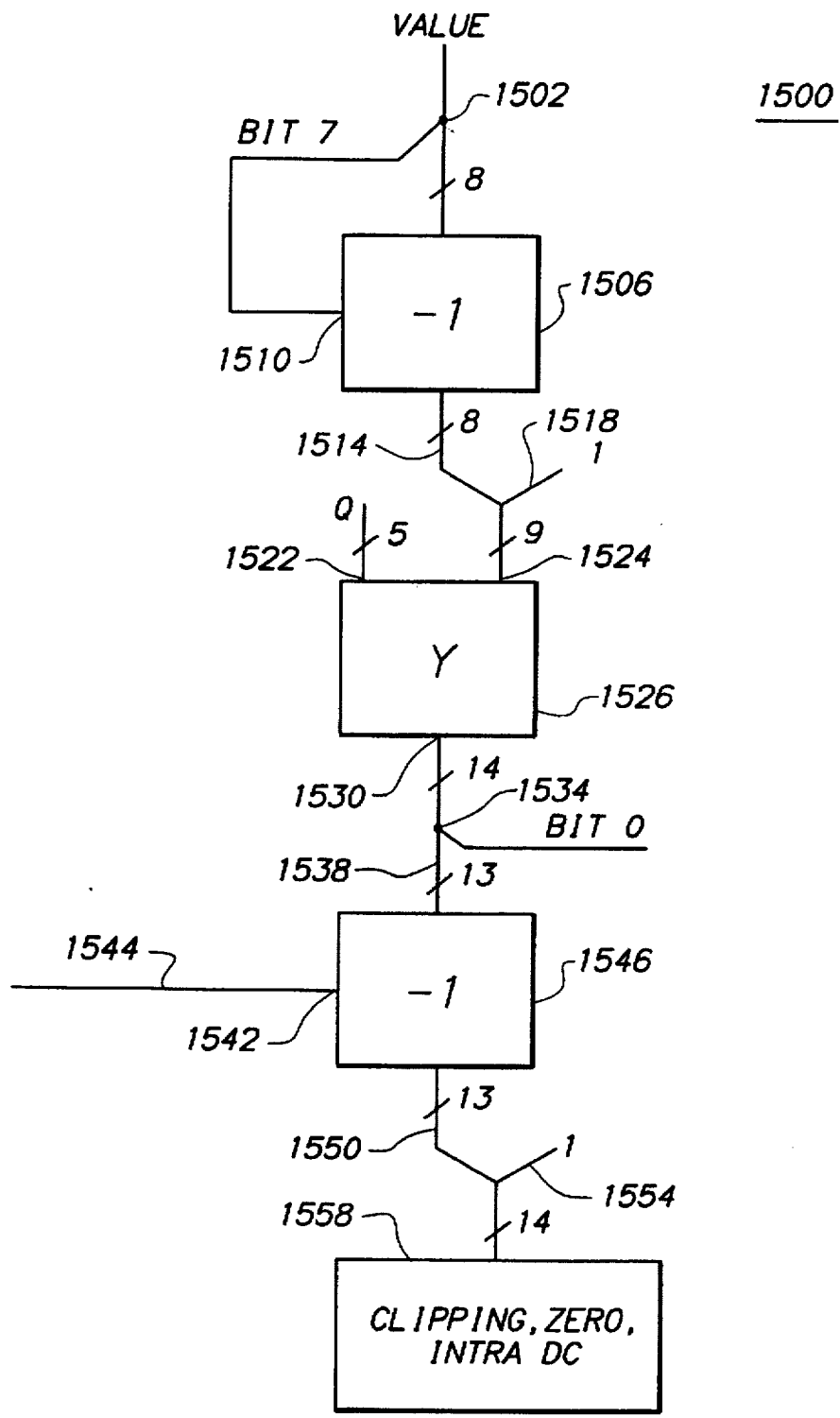
FIG. 15 shows a block diagram representation of a dequantization system which may be used within the system of FIG. 2.

Referring now to FIG. 15, there is shown improved dequantization system 1500. It will be understood that improved dequantization system 1500 may be used to provide a portion of the operations performed within dequantization block 222 of compression/decompression accelerator 120 within remote video processing system 100 of the present invention. Dequantization system 1500 may perform dequantization upon the data received from dequantization multiplexer 218 and apply dequantized data to selectable discrete cosine transform device 230 using only two decrement operations and one multiplication operation. Thus the operations of improved dequantization system 1500 are performed more quickly than the dequantization operations of convention dequantizers which are believed to require at least two additions and one multiplication. This improvement in dequantization speed results because the decrements of dequantization system 1500 may be performed more quickly than the additions of conventional dequantization systems.

Improved dequantization system 1500 assumes that value $\neq 0$ in Equations (2) because zero is not a legal input into system 1500. Dequantization system 1500 also assumes that $1 \leq Q \leq 31$ and $-127 \leq$ value $\leq +127$. In order to develop the computational flow of dequantization system 1500, dequantization Equations (2) may be rewritten as follows:

Q even $$d = Q*(2*value+sign(value))-sign(value)$$     Equations (10)

Q odd $$d = Q*(2*value+sign(value)).$$

It will be seen from Equations (10) that the two inputs into a multiplier in a system performing dequantization according to Equations (10) are (a) Q, and (b) 2*value+sign(value). It will be understood by those skilled in the art that the multiplier input quantity 2*value+sign(value), as set forth in Equations (10), must be between negative two hundred fifty-five and positive two hundred and fifty-five. Furthermore, it should be noted that the quantity may be expressed as set forth in Equations (11). It will also be understood that 2*value must be even and that 2*value+1 must therefore be odd. Likewise 2*(value−1) must be even and 2*(value−1)+1 must be odd.

$$sign(value) = +1 \Rightarrow d = 2*value + 1$$     Equations (11)

$$sign(value) = +1 \Rightarrow d = 2*(value-1)+1$$

The result of the multiplication Q*(2*value+sign(value)) of Equations (10) is set forth in Equations (12)

$$Q \text{ odd} \Rightarrow multout \text{ odd}$$

$$d = multout = 2\left(\frac{multout}{2}\right) + 1$$     Equations (12)

$$Q \text{ even} \Rightarrow multout \text{ even}$$

$$sign(value) = +1 \rightarrow 2\left(\frac{multout}{2} - 1\right) + 1$$

$$sign(value) = -1 \rightarrow 2\left(\frac{multout}{2}\right) + 1$$

Thus the eight bit input, value, is received by dequantization system 1500 by way of dequantization input bus 1502 and applied to conditional decrementing device 1506. The borrow input of value of input bus 1502 is applied to sign bit input 1510 of decrementing device 1506. Conditional decrementing device 1506 either decrements the value received by way of input bus 1502 or passes it through unchanged depending on the sign bit of the input value as received at sign bit input 1510. Conditional decrementing device 1506 applies the result, either decremented or passed straight through, to output bus 1514.

At point 1518 of the computation flow of dequantization device 1500, the eight bit output of conditional decrementing device 1506 is shifted to the right one bit position. A value of one is inserted into the least significant bit of the nine bit value resulting therefrom. It will be understood that this operation provides the results of the calculations set forth in dequantization Equations (11). In the preferred embodiment of dequantization device 1500 no specialized shifting circuitry is required to perform the operations associated with point 1518. Rather, in the preferred embodiment of dequantization device 1500, this result is obtained be merely wiring the eight bits from the output of decrementing device 1514 to the next higher order bits at input 1524 of multiplication device 1526. The least significant bit of this input value is hardwired high.

Multiplication device 1526 receives quantization factor Q by way of multiplication input 1522, as well as receiving the shifted output of device of conditional decrementing device 1506 by way of multiplication input 1524. These two inputs are multiplied within multiplication device 1524 to provide the fourteen bit output quantity represented as multout in dequantization Equations (12). This quantity appears at multiplication output 1530.

At point 1534 of dequantization system 1500 the quantity multout, provided by multiplication device 1526, is shifted one position to the left to provide the quantity multout/2 as set forth in Equations (12). This value is then applied, byway of input bus 1538, to conditional decrementing device 1546. Conditional decrementing device 1546 receives a control signal at control input 1542 by way of control line 1544. The control signal of line 1544 is high when value >0 and Q is even.

Conditional decrementing device 1546 either decrements the quantity received on input bus 1538 or passes it through unchanged according to this control signal as previously described with respect to conditional decrementing device 1506 and sign bit input 1510. The thirteen bit result of this conditional decrement operation is provided by decrementing device 1546 at output bus 1550. A hardwired value of one is applied to the signal of output bus 1550 at point 1554. The fourteen bit result is applied to block 1558 where it may be clipped, and where special cases such as zero value inputs and interblock DC encoding may be handled.

Figure 16:
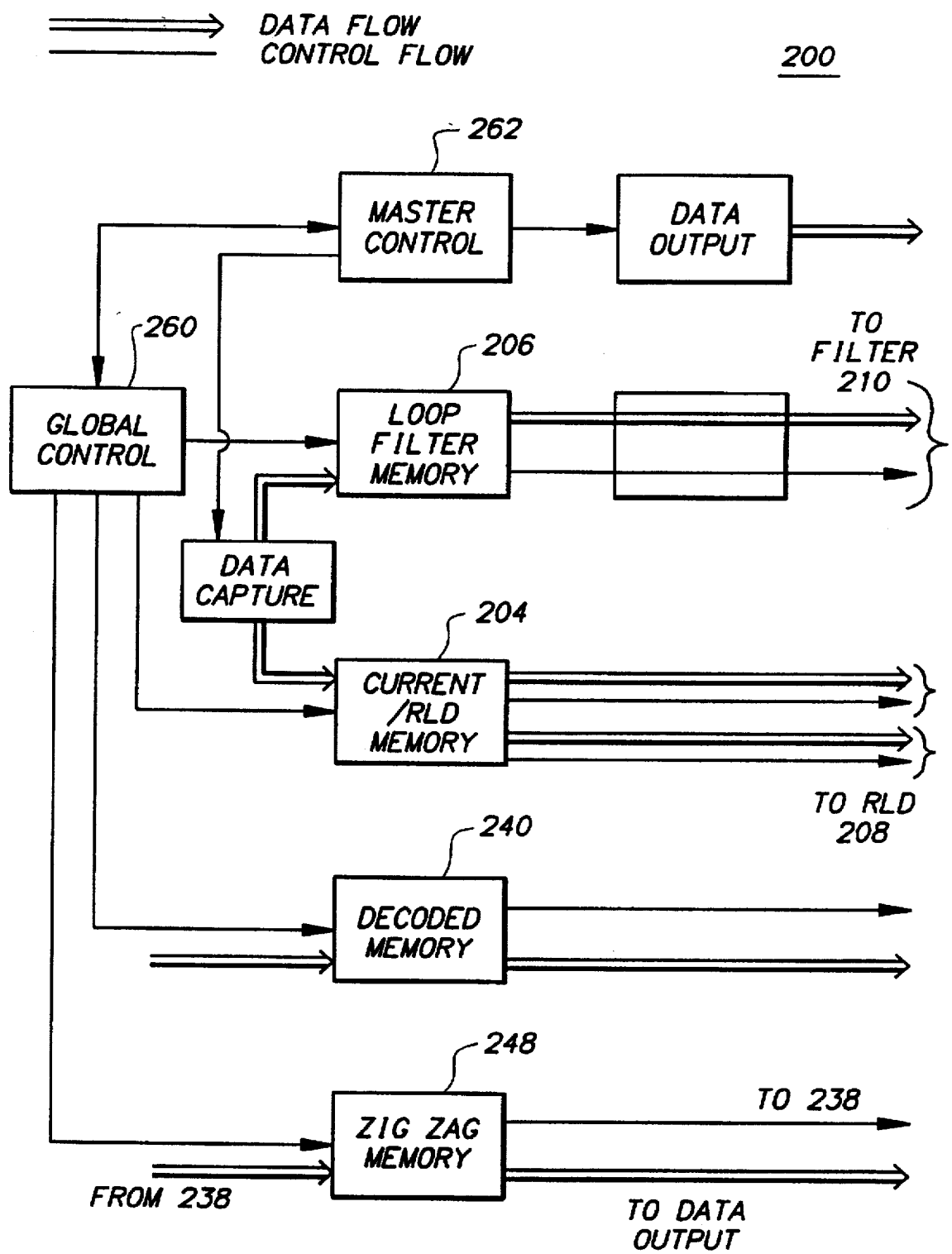
FIG. 16 shows a more detailed block diagram representation of the various memories and controls associated with the bus interface of the pipelined architecture of system of FIG. 2.

Referring now to FIG. 16, there is shown a more detailed representation of the various memories and controls associated with bus interface 200. Bus interface 200 is provided with four buffer memories 204, 206, 240, 248. Memories 204, 206, 240, 248 buffer the incoming data to be processed by compression/decompression system 120 as well as the results of operations performed by compression/decompression system 120 which are written to other devices within remote video processing system 100 using buses 116, 118.

Loop filter memory 206 stores the previous image block for both the encode and decode processes of accelerator 120 even when selectable loop filter 210 is disabled. Memory 206 is also used to store intermediate results of operations performed by loop filter 210. Thus it is ten bits wide in the preferred embodiment in order to accommodate two fraction bits required by loop filter 210 in addition to the eight bits of pixel data. When an image is initially loaded into loop filter memory 206, the eight bits of each image pixel are placed in the most significant eight bits of a location within loop filter memory 206. The least significant two bits set to zero.

Loop filter memory 206 is two-ported, with one read port 1604 and one write port 1602. Data is applied to write port 1602 by way of data line 203 and data is read from port 1604 by way of data line 207 as previously described. Write port 1602 of loop filter memory 206 has two sources of data. One source of data is bus interface 200 itself when a new image is loaded into compression/decompression accelerator 120. The other source of data is selectable loop filter 210 when intermediate filter results are generated. Loop filter 210 provides addresses of locations within loop filter memory 206 for its writes. Loop filter memory 206 increments write addresses itself during the load of image data from bus interface 200. Reads of loop filter memory 206 are asynchronous.

Run length decoder/current image memory 204 serves as an input buffer for two different functions. During the decode mode of compression/decompression accelerator 120, image memory 204 stores the incoming run/value pairs which are decoded by run length decoder 208. During the encode process the current image block to be encoded is stored in image memory 204.

In the preferred embodiment of accelerator 120 image memory 204 may have a single physical read/write port. The read port uses one of two addresses supplied to image memory 204. One address used by image memory 204 is provided by run length decoder 208 during decode in order to select data for decoding. The other address is provided by bus interface 200 during the encode mode of accelerator 120. Output data of image memory 204 is provided by way of line 205 in both a single byte format and in a sixteen bit format.

During the decode mode of accelerator 120, up to sixty-four run/value pairs may be decoded by run length decoder 208. There is a capacity for thirty-one sixteen bit run/value pairs plus the end of block code. If thirty-two or more run/value pairs occur in a block, run length decoder 208 pauses while the additional data is loaded. This is accomplished with a halt signal, asserted by image memory 204 when run length decoder 208 requests the thirty-third word, thereby indicating that the address has wrapped from thirty to zero.

Decoded image memory 240 stores the decoded image block which is written to memory external to compression/decompression accelerator 120, such as memory 114. When accelerator 120 is in the encode mode, this data represents the companded image which is stored in current/companded image block 302. Decoded image memory 240 is provided with one port which is loaded one byte at a time by frame adder 235. The single port of memory 240 is read four bytes at a time by bus interface 200 when accelerator 120 writes companded data onto data bus of remote video processing system 100 in order to permit motion estimation to be performed by video processor 112. The internal address incrementer of image memory 240 may be externally reset.

Zig-zag memory 248 stores the run/value pairs generated cooperatively by zig-zag/quantization block 238 and run length encode block 246 as previously described. The run/value pairs are read from zig-zag memory 248 by bus interface 200 for writing data bus of remote video processing system 100. Memory 248 contains its own address incrementer.

Bus interface 200 is also provided with global control block 260 which activates the other elements associated with bus interface 200 such as memories 204, 206, 240, 248. Most activities of elements activated by global control block 210 are completed in a predetermined number of clock cycles. For these elements, global control block 260 counts clock cycles to determine the end of a control state. The activities of the external bus interface are tracked by an end-of-process signal received from bus interface 200 by way of master control block 262. In addition to this end-of-process signal and the clock inputs received by global control block 260 from master control 262 include the system reset and halt control signals of compression/decompression accelerator 120. When a halt control signal is received the clock of global control block 260 is suspended.

Figure 17:
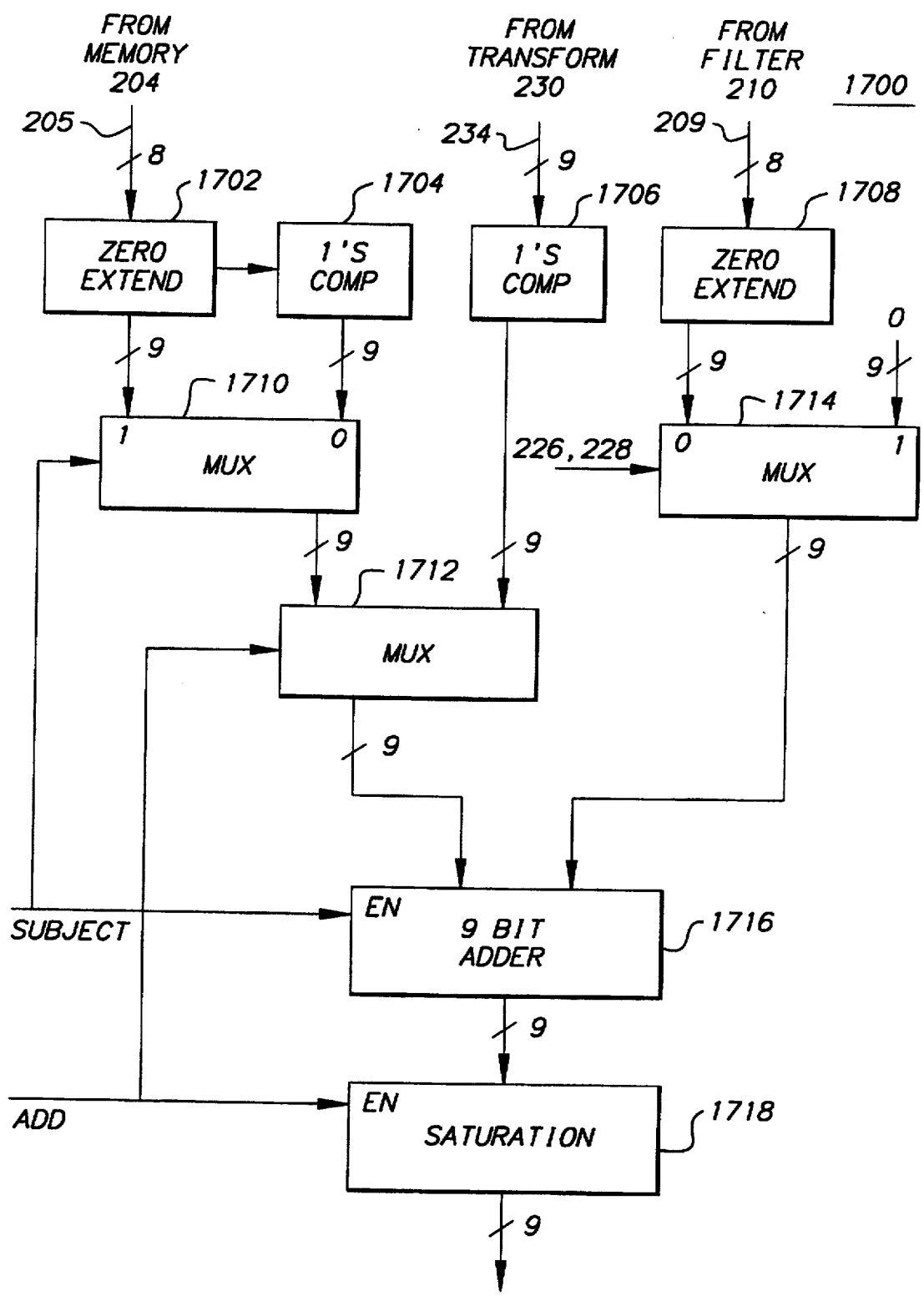
FIG. 17 shoes a more detailed representation of a frame add/subtract suitable for use in the pipelined architecture of FIG. 2.

Referring now to FIG. 17, there is shown a block diagram representation of selectable frame add/subtract unit 1700 of compression/decompression accelerator 120. It will be understood that selectable frame add/subtract unit 1700 is effective to selectably provide the operations of both frame difference block 220 and frame add block 235 of accelerator 120. These operations are selected under the control of control lines 226, 228 depending on whether accelerator 120 is operating in the encode mode or the decode mode and, when accelerator 120 is operating in the encode mode, whether encoded data is being prepared to be transmitted or to be decoded to provide a companded image.

Within add/subtract unit 1700, data received from memory 204 is zero extended and complemented by blocks 1702, 1704. The results are multiplexed in block 1710 according to whether frame differencing is being performed. The output result of block 1710 is multiplexed in block 1712 with the complement of data from selectable transform device 230 by way of complement block 1706. This output result is added in block 1716 with the multiplexed output result of multiplexer block 1714. The output of multiplexer block 1714 may be zero or zero extended data from block 1708.

As previously described, frame difference block 220 and frame add block 235 perform several functions within compression/decompression accelerator 120. Frame difference block 220 provides selectable discrete cosine transform device 230 with motion estimation data by way of multiplexer 224 for encoding. Frame add block 235 generates companded image data during the encode mode of accelerator 120 and applies the companded image data to decoded image memory 240. During the decode mode of accelerator 120 blocks 220, 235 reconstruct the current image in current/companded image block 302. Furthermore, blocks 220, 235 prevent quantization distortion of transform coefficient amplitude that may cause arithmetic overflow by providing saturation functions.

In the preferred embodiment of compression/decompression accelerator 120 frame difference block 220 and frame add block 235 are combined into a single hardware circuit. This is possible because the frame add and frame subtract functions of accelerator 120 are never performed simultaneously. Frame add/subtract unit 1700 is used during both the encode and decode modes of accelerator 120. In the encode mode, it is necessary to reconstruct the image as seen by a receiving device in order for video processor 112 to determine how the next block of data should be encoded. For an inter block, the companded image is generated by adding previous block memory to the encoded difference as received by the receiving device after discrete cosine transforms, quantization and dequantization. The addition is done by the frame add hardware.

In the decode mode of accelerator 120, the reconstruction of an image for an inter block is done by adding the previous predicted pixel block with the decoded image data or difference data. Frame addition and frame subtraction are not required for intra block data since there are no dependencies involved with previous image.

To prevent quantization distortion of transform coefficient amplitudes causing arithmetic overflow within encode dataflow 300 and decode dataflow 600, a clipping or saturate function is included in block 1718 of add/subtract unit 1700. The saturation function is applied to a reconstructed image which is formed by summing the prediction and the prediction error during the encoding mode of compression/decompression accelerator 120. Results are saturated between zero and two hundred fifty-five.

In order to optimize resources and increase throughput, the frame addition in the decode mode and frame subtraction in the encode mode are done simultaneously with the horizontal filter cycle or second filter cycle of loop filter 210. Since the horizontal cycle of loop filter 210 scans the eight-by-eight image block according to row, the current block data to be added or subtracted from it must also be fetched according to row. Global control block 260 ensures that the horizontal pass does not start until the current image data is ready.

Figure 18:
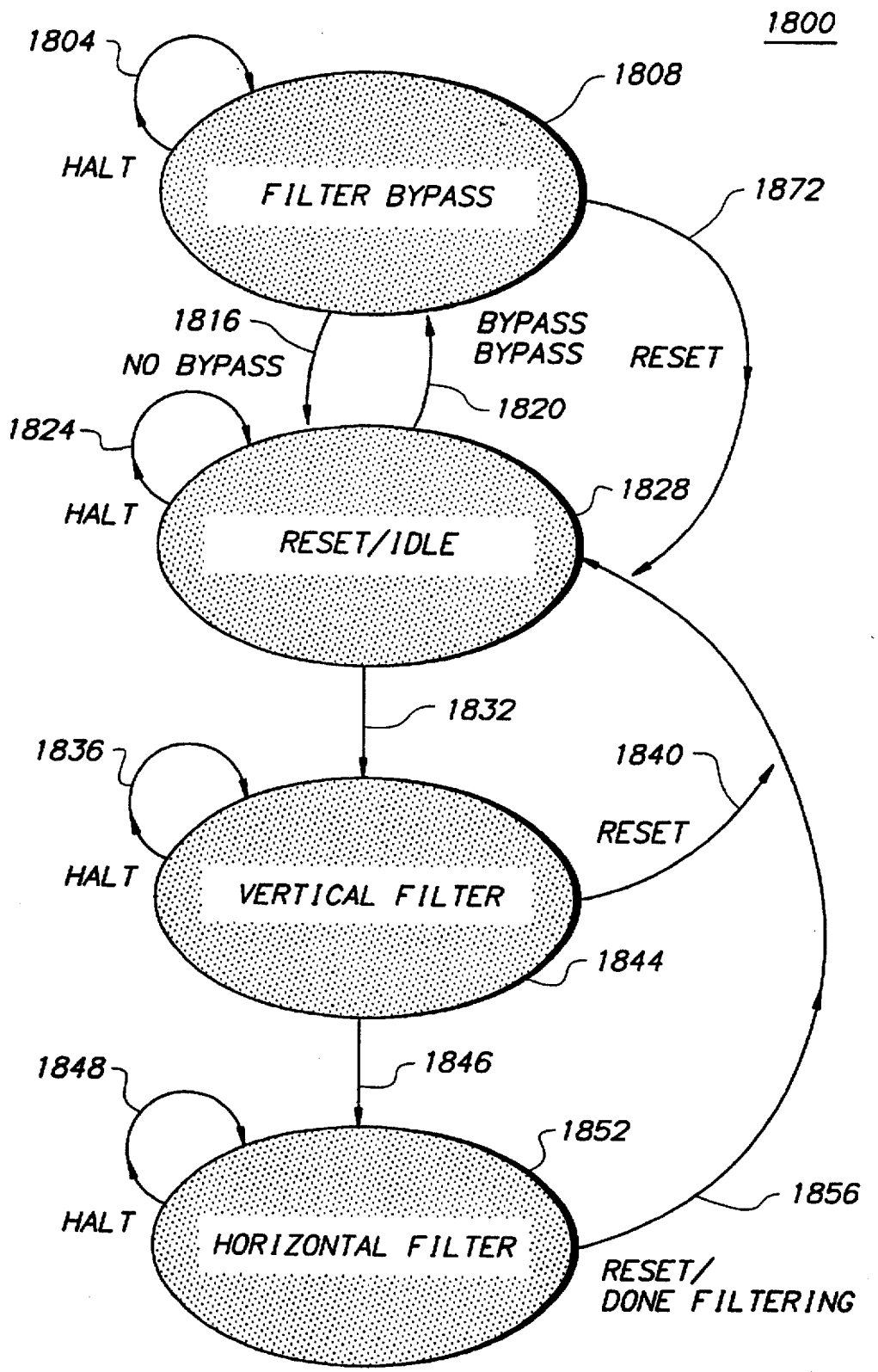
FIG. 18 shows a state diagram representation of the operations of the selectable loop filter of FIG. 2.

Referring now to FIG. 18, there is shown loop filter state diagram 1800 representing the state of selectable loop filter 210 as well as a more detailed block diagram representation of portions of selectable loop filter 210. Selectable loop filter state diagram 1800 represents the states of selectable loop filter 210 when compression/decompression accelerator operates in the encode mode as described in encode dataflow 300.

Selectable loop filter 210 is a two-dimensional low-pass spatial filter which operates on predicted eight-by-eight blocks of a video image as previously described. Filter 210 smooths video data and reduces high frequency content in order to produce a better compression ratio during the discrete cosine transform of selectable transform device 230 and the run length encoding of encoder block 246. The improvement in the compression ratio is at the expense of resolution or image sharpness because of the removal of higher frequencies. Selectable loop filter 210 may be enabled and disabled when encoding or decoding an image using control line 214.

In the filtering process of selectable loop filter 210, the value of a pixel is adjusted by averaging it with the values of adjacent pixels. Different weights are assigned to the adjacent pixels as previously shown in Table I. The pixel being filtered is centered and highlighted in Table I and is given the highest weight of the nine pixels involved in the averaging.

Simultaneously applying a loop filter such as selectable loop filter 210 in two dimensions is difficult. However, it can be shown that the filtering process is symmetrical and can be separated into two one-dimensional processes that are much easier to implement. Thus the two-dimensional filtering process is separated into a one-dimensional horizontal function and a one-dimensional vertical non-recursive function in the preferred embodiment. The values ¼, 1/2 and ¼ are used as the coefficients for each one-dimensional function. However, at the block edges where one or more points or fall outside the block only one-dimensional filtering is applied. Filtering is not applied to the four corner pixels.

When performing the filtering of selectable loop filter 210, the eight-by-eight predicted pixel block is organized in a two-dimensional array of eight rows and eight columns of eight bit data. This data is stored in loop filter memory 206 as an eight-by-eight ten bit block. The ten bits per pixel in loop filter memory 206 are necessary to maintain the required resolution during the immediate filtering step as previously described. Loop filter 210 first operates upon the eight columns, performing a one-dimensional vertical filtering on each. The intermediate results generated by this vertical filtering process are stored back into loop filter memory 206 from which the original data is read. The read and write addresses are generated by address generator 264.

Upon the completion of the vertical filter cycle, selectable loop filter 210 scans the two-dimensional array being filtered row by row to perform the horizontal filter process. The result of this process is a stream of twelve bit precision values which are rounded to eight bits. This result is applied directly to frame add/subtract unit 1700 in addition to being written back to the loop filter memory 206. Simultaneously, with the second or horizontal pass output, data is read from current image memory 204. The read address for memory 204 is the same as the write address provided by loop filter 210. The two streams of eight bit values are sent to frame add/subtract unit 1700.

Selectable loop filter 210 may begin this filtering process when loop filter memory 206 is filled. Before this time, loop filter 210 idles in idle state 1828 of loop filter state diagram 1800. Selectable loop filter 210 enters reset/idle state 1828 whenever it is initialized in order to prepare for a new loop filter cycle. While in state 1828 the address counter is set to zero and the horizontal/vertical filter state is set to vertical.

When the filtering process is begun, vertical filter state 1844 is entered by way of pathway 1832. The first pass, or the vertical pass, of loop filter 210 scans an eight-by-eight input matrix of pixel values starting from the top of the matrix and proceeding to the bottom. These vertical scans start at the top left corner of the matrix which may be designated location 0,0. Three buffer registers 1902, 1904, 1906 are used to store the pixels at the input of filter adder 1908. When first register 1902 and second register 1904 are filled, processing by loop filter 210 begins and the partially processed values are written back loop filter memory 206 by way of data line 209. At the end of the vertical state 1844, loop filter memory 206 is filled with sixty-four ten bit intermediate values. The bottom two bits of each intermediate value are the fractional bits which maintain precision for the next pass of loop filter 210.

After the vertical pass of loop filter memory 206 is complete, selectable loop filter 210 pauses and waits for control signals from global control block 260. If a reset occurs during this time, loop filter 210 enters idle/reset state 1828 by way of reset path 1840. If no reset occurs during this time, the control signal beginning of the horizontal filter cycle is provided by global control block 260 when (1) frame memory 204 is full, (2) selectable transform device 230 is ready to receive data from frame add/subtract unit 1700, and (3) the vertical pass cycle is complete.

When the control signal from control block 260 is received by selectable loop filter 210 horizontal filter state 1852 of loop filter state diagram 1800 is entered by way of path 1848. During the horizontal pass of selectable loop filter 210 the matrix of intermediate loop results in loop filter memory 206 is read in the left to right horizontal direction. Data is written back to loop filter memory 206 in the manner previously described with respect to the results of the vertical pass. Data is also sent to frame difference block 220 or selectable frame add/subtract unit 1700 simultaneously when compression/decompression accelerator 120 is operating in the encode mode.

Loop filter 210 returns to idle state 1828 of state diagram 1800 by way of path 1856 when the horizontal filtering is complete or a reset occurs. Selectable loop filter 210 remains in reset/idle state 1828 until either (1) a vertical control signal is asserted instructing loop filter 210 to exit state 1828 by way of pathway 1832, or (2) logic within global control 260 decodes a filter bypass command thereby indicating an exit from state 1828 by way of pathway 1820. All other signals are ignored by loop filter 210 in reset/idle state 1828.

In filter bypass state 1808 of filter state diagram 1800, no filtering is performed by selectable loop filter 210. When loop filter 210 is in bypass state 1808 adder 1908 is disabled. Address generator 264 produces addresses to permit frame add/subtract unit 1700 to write to selectable discrete cosine transform device 230 or decoded image memory 240. Data is read from loop filter memory 206 and current image memory 204 and applied to selectable transform block 230. Bypass state 1808 is entered by way of path 1820 from idle state 1828. Selectable loop filter 210 exits bypass state 1808 when a reset occurs or it has reached the end of a block.

Figure 19:
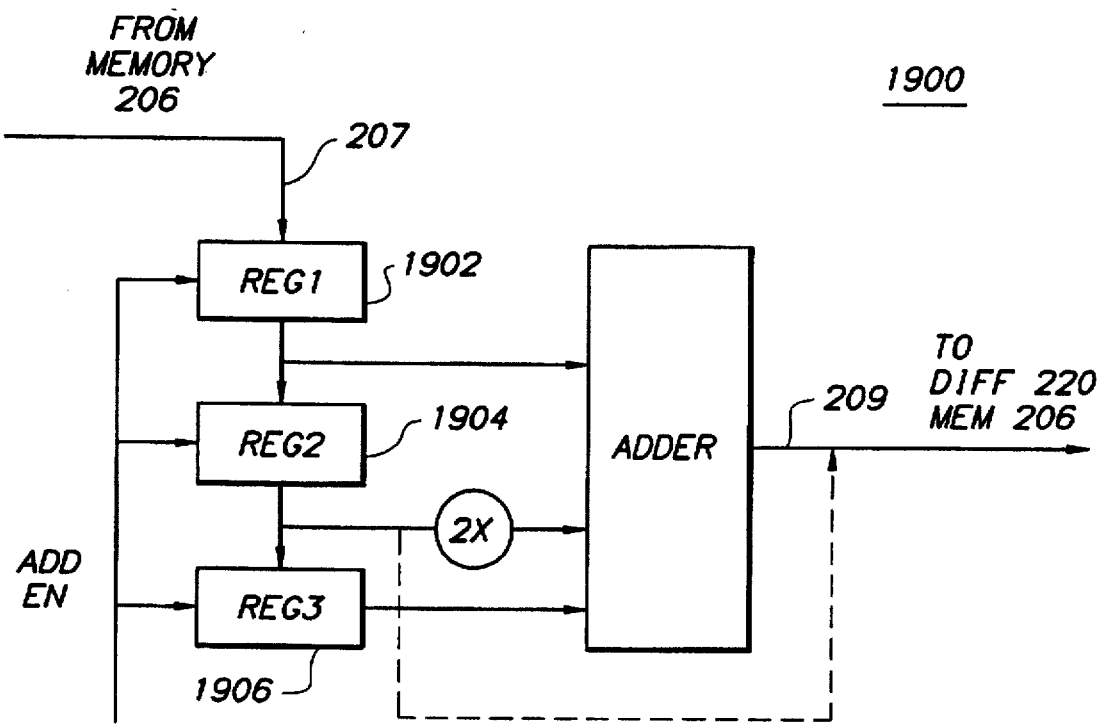
FIG. 19 shows a more detailed block diagram representation of the adder unit of the selectable loop filter of FIG. 2.
Figure 20:
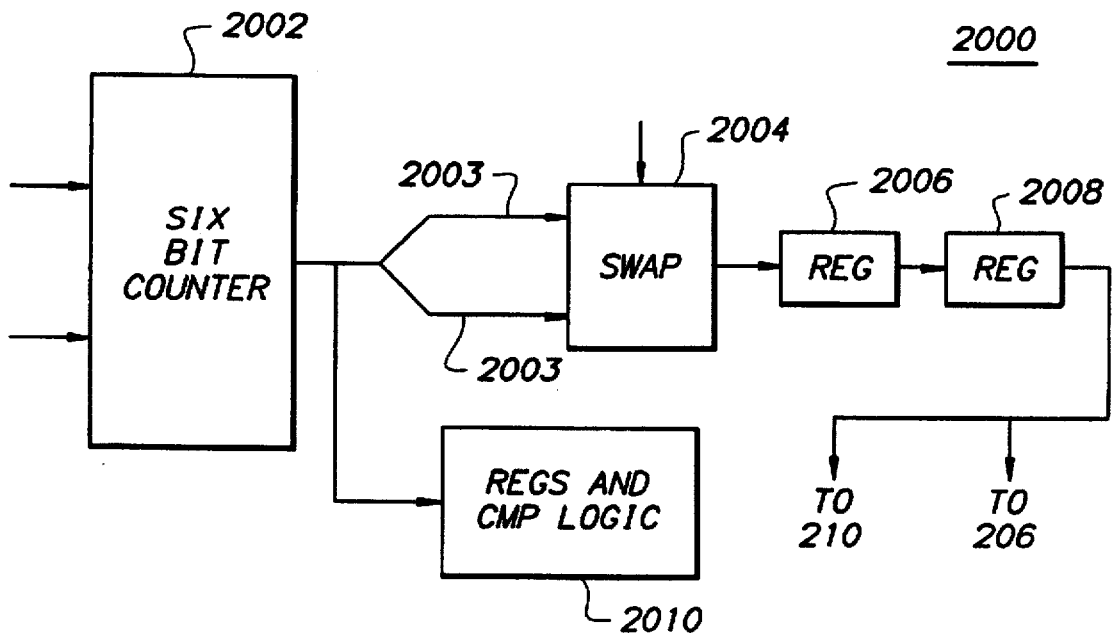
FIG. 20 shows a more detailed representation of the address unit of the loop filter of FIG. 2.

Referring now FIGS. 19, 20, there are shown adder unit 1900 and address unit 2000 of loop filter 210. Address generator 2002 within address unit 2000 generates all the addressing for loop filter memory 206 and current image memory 204 accesses. The addresses are generated sequentially and may range from 00H to 3fH. Address generator has three main functions. The first function of address generator 2000 is to generate horizontal pass addresses for loop filter 210. Generator 2002 produces sequentially ascending addresses from 00H to 3fH during the horizontal pass. Whenever a corner or side address is processed by adder 1900 the output of adder 1900 is ignored and the contents of 1904 are copied instead. The addresses generated are used to read from loop filter memory 206 and to read from current image memory 204.

Another function of address generator 2002 is generating vertical pass addresses for loop filter 210. In this mode, the upper three bits are swapped with the lower three bits of the address generated to produce a top-to-bottom scan of the eight-by-eight matrix by loop filter 210. The swapping is performed using multiplexer 2004 whenever a corner, a top row or a bottom row address of the pixel matrix is processed by adder 1908. When this occurs the output of adder 1908 is ignored and the contents of REG2 are copied over instead. The addresses are used to read from loop filter memory 206 and to write back to loop filter memory 206. Current image memory 204 is not accessed during this pass.

Another function of address generator 2002 is generating read addresses of loop filter memory 206 when selectable loop filter 210 is bypassed within accelerator 120. When this occurs adder unit 1900 is disabled and the addresses generated are used to read of loop filter memory 206 and current image memory 204. The data is sent to the frame add/subtract block 1700 after being sent through disabled adder 1908. The addresses generated are all in the horizontal read mode, from left to right.

A determination is made when a corner, a top row, or a bottom row is being processed dividing the output of counter 2002 into two sets of three bits each using buses 2003. Buses 2003 are applied to multiplexer 2004 and wrapped. Thus, in summary, address generator 2000 of selectable filter 310 includes counter 2002, two registers 2006, 2008 and byte-swap multiplexer 2004. Address register 200 generates the addresses in loop filter memory 206 from which the filter input data is read from and the addresses where the intermediate filtered result are stored. It also generates addresses for reading from current image memory 204, for writing to selectable discrete cosine transform device 230, and for writing decoded image memory 240. During the vertical pass of loop filter 210, the upper three bits of the address are swapped with the lower three bits by multiplexer 2004. This results in a top-to-bottom read instead of a left-to-right read of the eight-by-eight pixel matrix being processed by loop filter 210.

Adder unit 1900 includes three input twelve bit adder 1908. In addition to three twelve bit inputs adder 1908 has a single output. Two of the inputs of adder 1908 are connected directly to the outputs of registers 1902, 1906 and the third input of adder 1908 is from register 1904. Register 1904 contains the pixel that is currently being processed. Registers 1902, 1904, 1906 may be standard ten bit registers. During the first pass, they may contain only eight bit values with two extra bits padded on. The output of registers 1902, 1906 go directly to adder 1908. The output register 1904 is applied to a multiply-by-two operator before being applied to adder 1908. The multiply operation is done by mapping the bits up by one.

If the pixel being processed is a corner/side pixel that requires no filtering, the output from adder 1908 is ignored and the contents of register 1904 are written directly to loop filter memory 206. The decision whether to writing or to bypass is made by logic located at the output of address generator 2000. This also occurs when selectable loop filter 210 is in filter bypass state 1802 of state diagram 1800.

Thus, in summary, adder unit 1900 of selectable loop filter 210 includes three registers 1902, 1904, 1902 and two two-input twelve bit adders in series. Three consecutive inputs to filter 210 are queued in a pipeline formed by register 1902, 1904, 1906. Adder circuit 1908 performs the one-dimensional filter process by performing a simple add register 1902, 1906, and a double add for register 1904. During the first or vertical pass of loop filter 210 three eight-bit values are read first or and a ten-bit sum is written back to loop filter memory 206. During the second or horizontal pass of loop filter 210 the ten-bit values are read back from loop filter memory 206 and added to result in a twelve bit value. This result is rounded up to eight bits before sending it to the frame add/subtract unit 1700. Values whose fractional part are one-half are rounded up.

Controller 213 is responsible for handling the various inputs from other units and decoding them to provide controls for adder unit 1900 and address generator 2000. For example, controller 213 transmits control signals to address generator 2000 to start counting. It also enables and disables adder 1908. Based on control signals received by controller 213, controller 213 may put loop filter 210 into the bypass mode. Filter 210 then acts as an address generator for frame add/subtract unit 1700. Loop filter controller 213 of selectable loop filter 210 includes its own state machine and some miscellaneous logic. The state machine of controller 213 sequences the various filter and read/write processes.

Figure 21A:
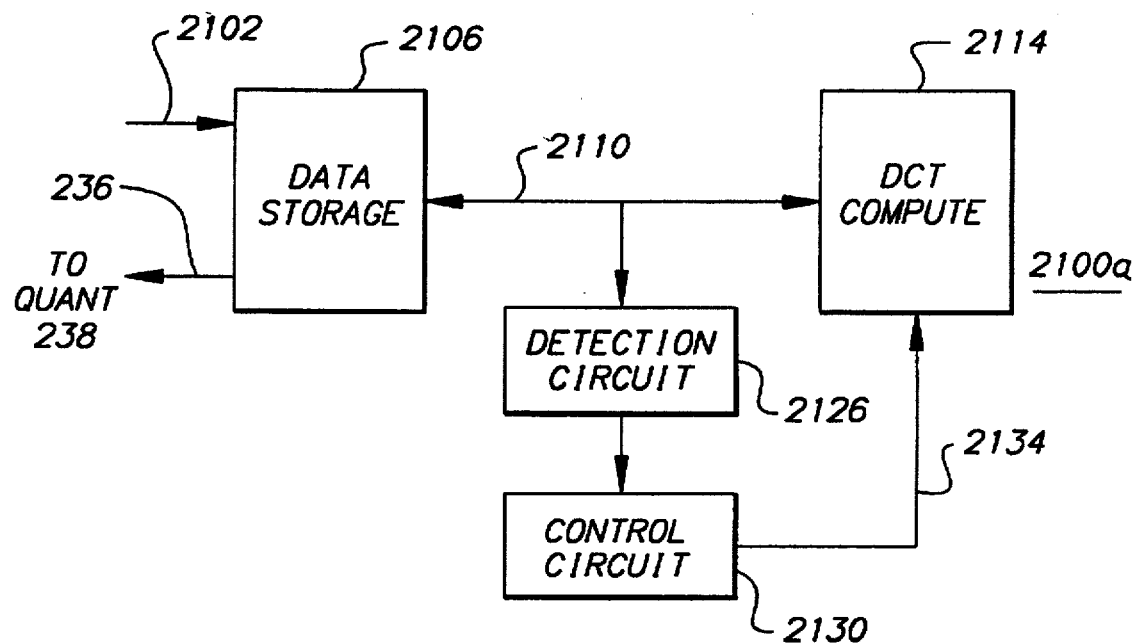
FIGS. 21A,B show block diagram representations of alternate embodiments of a system for testing data and selectably performing a discrete cosine transform suitable for use in the system of FIG. 1.
Figure 21B:
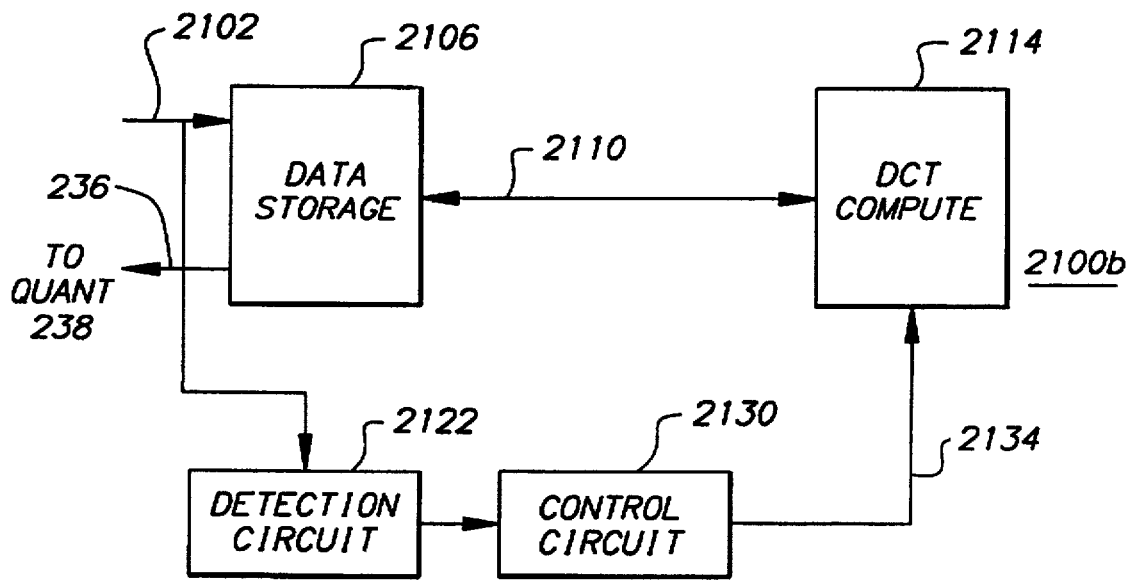

Referring now to FIGS. 21A,B, there are shown data testing discrete cosine transform systems 2100a,b. Discrete cosine transform systems 21a,b are alternate embodiments of a transform system which may be provided within compression/decompression accelerator 120. Within data testing discrete cosine transform systems 2100a,b, a determination is made of the input data which is applied to transform systems 2100a,b. When predetermined input data is detected, the discrete cosine transform operations are not performed within transform systems 2100a,b. In these cases pre-determined known output results corresponding to the detected input data are applied to output line 236 of data testing discrete cosine transform systems 2100a,b. It will be understood that the data testing and the selective performing of the discrete cosine transform within data testing discrete cosine transform systems 2100a,b may be performed for both forward discrete cosine transforms and inverse discrete cosine transforms. Furthermore, the data testing of the present invention may be performed within selectable discrete cosine transform device 230 of accelerator 120.

Within data testing discrete cosine transform systems 2100a,b, input data is received at input bus 2102 and applied to data storage 2106. The input values stored in data storage 2106 are applied to discrete cosine transform computation block 2114 by way of bidirectional data bus 2110. Discrete cosine transform computation block 2114, after performing the discrete cosine transform upon the data received by way of data bus 2110, applies the results of the transform back to data storage 2106 by way of bidirectional data bus 2110. The transformed data may later be applied to quantization block 238 by way of output line 236 as previously described.

When input data within transform system 2100a is applied from data storage 2106 to transform computation block 2114 by way of bidirectional data bus 2110, detection circuit 2126 monitors the data which is received by block 2114 for transformation. Detection circuit 2126 detects input data which produces a known result when operated upon in accordance with transforms such as those described by Equation (4) or Equation (5).

For example, detection circuit 2126 may detect an input matrix on data bus 2110 having rows or columns formed entirely of zeros. In this case no transform is necessary. Additionally, detection circuit 2126 may detect matrices wherein all of the values of an entire row are non-zero and equal to each other or all of the values of an entire column are equal to each other. This corresponds to the DC case wherein a known constant output value may be inserted. Additionally, detection circuit 2126 may be adapted to detect an entire block of constant data being applied by data storage 2106 to transform computation block 2114. Due to the quantization operations, and other operations normally performed in encoding and decoding processes, the cases detected by detection circuit 2126 may occur quite frequently.

As previously described, when data corresponding to the cases detected by detection circuit 2126 is applied to discrete cosine transform computation block 2114 the results of applying transforms such as Equation (4) or Equation (5) are known. Thus, these results may be pre-calculated and stored within transform systems 2100a,b. Transform system 2100a may store output values corresponding to any number of differing cases which detection circuit 2126 may be adapted to detect.

When these cases are detected, detection circuit 2126 applies a detection signal to control circuit 2130. In response to this detection signal control circuit 2130 applies a control signal to discrete cosine transform computation block 2114 by way of control line 2134. The control signal transmitted by way of control line 2134 instructs discrete cosine transform computation block 2114 not to perform the transform operations. Additionally, the signal of control line 2134 may provide computation block 2114 with the pre-calculated output results corresponding to the input case detected by detection circuit 2126. In an alternate embodiment of data testing discrete cosine transform system 2100a, discrete cosine transform computation block 2114 may store these known output values itself and provide them in response to the control signal from control circuit 2130.

The transform output results, which are obtained without actually performing the discrete cosine transform operations within computation block 2114, are then applied to data storage 2106 by way of bidirectional bus 2110. It is believed that this method saves approximately ten to twelve cycles compared with actually performing the computations within transform computation block 2114 when detection circuit 2126 detects the cases described above.

Within data testing discrete cosine transform system 2100b, detection circuit 2122 is applied to input bus 2102 rather than bidirectional data bus 2110. Detection circuit 2122 may be adapted to detect any of the cases detected by detection circuit 2126. When detection circuit 2122 detects these cases on input bus 2102 of system 2100b, it applies a control signal to control circuit 2130 as previously described with respect to detection circuit 2126. In a similar manner detection circuit 2122 may store the pre-calculated output results and apply them to computation block 2114 by way of control lines 2134. Alternatively, control circuit 2122 may signal computation block 2114 to provide pre-calculated output values which are stored in block 2114. Within system 2100b each row and each column of an input matrix may be tagged to indicate its status as determined by detection circuit 2122 during processing. Thus a conventional eight by eight input matrix received by transform system 2200b may be enlarged to a nine by nine matrix wherein the positions within one row and one column may be used to indicate, for example, whether the row or column is formed of zeros or other equal values.

It will be understood that various changes in the embodiments which have been described and illustrated in order to explain the nature of this invention may be made by those skilled in the art without departing from the principle and scope of the invention as expressed in the following claims.

We claim:

1. A video processor task-splitting system having system memory for performing a plurality of video processor functions, comprising:

first video processor means for performing a first selected portion of said plurality of video processor functions;

second video processor means comprising a compression/decompression accelerator, connected to said first video processor means, for performing a second selected portion of said plurality of video processor functions different from said first selected portion of said plurality of video processor functions;

said first video processor means having means for receiving data from said system memory, and for performing motion estimation upon said received data, and for applying motion estimation information to said second video processor means in response to said motion estimation;

said second video processor means having means for receiving said motion estimation information, and for performing a discrete cosine transform, and for quantization operations in accordance with said motion estimation information to provide encoded information, and for applying said encoded information to said first video processor means; and, said first video processor means having means for receiving said encoded information, and for performing variable length encoding upon said encoded information, and for storing variable length encoded data in said system memory.

2. The video processing system of claim 1, wherein said second video processor means further comprises frame add means and frame subtract means.

3. The video processing system of claim 2, wherein said second video processor means further comprises run length encoding means and run length decoding means.

4. The video processor system of claim 3, wherein said first video processor means further comprises programmable processor means and program control means.

5. The video processor system of claim 2, wherein said second video processor means further comprises a loop filter.

6. In a video processor task-splitting system having system memory, a method for performing a plurality of video processor functions, the method comprising the steps of:

(a) performing, with a first video processor, a first selected portion of said plurality of video processor functions;

(b) performing, with a second video processor comprising a compression/decompression accelerator connected to said first video processor, a second selected portion of said plurality of video processor functions different from said first selected portion of said plurality of video processor functions;

(c) receiving data from said system memory with said first video processor, performing motion estimation with said first video processor upon said received data, and applying motion estimation information with said first video processor to said second video processor means in response to said motion estimation;

(d) receiving said motion estimation information with said second video processor, performing a discrete cosine transform with said second video processor, performing quantization operations with said second video processor in accordance with said motion estimation information to provide encoded information, and applying said encoded information to said first video processor with said second video processor; and (e) receiving, with said first video processor, said encoded information, performing variable length encoding upon said encoded information with said first video processor, and storing, with said first video processor, variable length encoded data in said system memory.

7. The method of claim 6, wherein said second video processor comprises frame add means and frame subtract means.

8. The method of claim 7, wherein said second video processor further comprises run length encoding means and run length decoding means.

9. The method of claim 8, wherein said first video processor comprises programmable processor means and program control means.

10. The method of claim 7, wherein said second video processor comprises a loop filter.

* * * * *